US011743016B2

(12) United States Patent
Kwon et al.

(10) Patent No.: US 11,743,016 B2
(45) Date of Patent: Aug. 29, 2023

(54) METHOD AND APPARATUS FOR WIRELESS COMMUNICATIONS

(71) Applicant: NXP USA, Inc., Austin, TX (US)

(72) Inventors: Young Hoon Kwon, Laguna Niguel, CA (US); Rui Cao, Sunnyvale, CA (US); Liwen Chu, San Ramon, CA (US); Hongyuan Zhang, Fremont, CA (US); Hari Ram Balakrishnan, Chennai (IN); Sudhir Srinivasa, Los Gatos, CA (US); Sayak Roy, Kolkata (IN); Xiayu Zheng, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 98 days.

(21) Appl. No.: 17/239,363

(22) Filed: Apr. 23, 2021

(65) Prior Publication Data

US 2021/0336752 A1 Oct. 28, 2021

Related U.S. Application Data

(60) Provisional application No. 63/015,202, filed on Apr. 24, 2020.

(30) Foreign Application Priority Data

Jul. 8, 2020 (IN) ............................ 202021029065
Jul. 23, 2020 (IN) ............................ 202021031558
(Continued)

(51) Int. Cl.
*H04L 5/00* (2006.01)
*H04L 1/1867* (2023.01)
(Continued)

(52) U.S. Cl.
CPC .......... *H04L 5/0094* (2013.01); *H04L 1/0026* (2013.01); *H04L 1/0068* (2013.01);
(Continued)

(58) Field of Classification Search
CPC ... H04L 5/0094; H04L 1/0026; H04L 1/0068; H04L 1/1896; H04L 25/0226;
(Continued)

(56) References Cited

U.S. PATENT DOCUMENTS

2016/0315681 A1* 10/2016 Moon ............... H04W 74/0816
2017/0202020 A1* 7/2017 Cherian ................ H04L 5/0053
(Continued)

FOREIGN PATENT DOCUMENTS

EP 3996441 A1 * 5/2022 ........... H04B 7/0452

OTHER PUBLICATIONS

IEEE, "IEEE P802.11ax™/D3.1", Draft Standard for Information technology—Telecommunications and information exchange between systems Local and metropolitan area networks Specific requirements, Aug. 2018, 682 pgs.
(Continued)

*Primary Examiner* — Huy D Vu
*Assistant Examiner* — Robert Ma

(57) ABSTRACT

Embodiments of a method and an apparatus for wireless communications are disclosed. In an embodiment, a method for wireless communications involves operating an Access Point (AP) using feedback subcarrier indices for a bandwidth up to 320 MHz, signaling, by the AP, to a client, a subcarrier location set on which a feedback report is solicited, signaling, by the AP, to a client, a feedback type solicited on the subcarrier location, and indicating, by the client, feedback subcarrier indices for the subcarrier location set via the feedback report solicited by the AP.

23 Claims, 27 Drawing Sheets

(30) Foreign Application Priority Data

| | | | |
|---|---|---|---|
| Jul. 23, 2020 | (IN) | ............................. | 202021031611 |
| Jul. 30, 2020 | (IN) | ............................. | 202021032715 |
| Sep. 24, 2020 | (IN) | ............................. | 202021041440 |

(51) Int. Cl.

| | |
|---|---|
| ***H04L 1/00*** | (2006.01) |
| ***H04L 25/02*** | (2006.01) |
| *H04W 72/0453* | (2023.01) |
| *H04W 72/044* | (2023.01) |
| *H04W 74/08* | (2009.01) |

(52) U.S. Cl.
CPC ........ *H04L 1/1896* (2013.01); *H04L 25/0226* (2013.01); *H04L 5/0053* (2013.01); *H04W 72/046* (2013.01); *H04W 72/0453* (2013.01); *H04W 74/0816* (2013.01)

(58) Field of Classification Search
CPC ............... H04L 1/1861; H04L 25/0204; H04L 25/0228; H04L 5/0055
See application file for complete search history.

(56) References Cited

U.S. PATENT DOCUMENTS

| | | | | |
|---|---|---|---|---|
| 2019/0349067 | A1* | 11/2019 | Huang ................ | H04W 72/046 |
| 2021/0274484 | A1* | 9/2021 | Park .................. | H04W 72/0453 |
| 2021/0392647 | A1* | 12/2021 | Park .................. | H04W 72/0453 |
| 2022/0322348 | A1* | 10/2022 | Park .................. | H04W 72/0453 |

OTHER PUBLICATIONS

Porat, Ron et al. "Feedback Tone Map and Quantization", doc.: IEEE 802.11-16/0649r0, May 14, 2016, 17 pgs.

Yiu, Ross Jian et al. "HE NDPA frame format", doc.: IEEE 802.11-16/0609r1, May 13, 2016, 19 pgs.

IEEE, "IEEE P802.11ax™/D6.0", Draft Standard for Information technology—Telecommunications and information exchange between systems Local and metropolitan area networks Specific requirements, Nov. 2019, 780 pgs.

* cited by examiner

200

| BANDWIDTH | Ng | SUPERSET OF SUBCARRIER INDICES |
|---|---|---|
| 80 MHz | 4 | -500, -496 ..., -8,-4, 4, 8, ..., 496, 500 |
| | 16 | -500, -484 ..., -20,-4, 4, 20, ..., 484, 500 |
| 160 MHz | 4 | -1012, -1008, ..., -520, -516, -508, -504, ..., -16, -12,<br>12, 16, ..., 504, 508, 516, 520, ..., 1008, 1012 |
| | 16 | -1012, -996, ..., -532, -516, -508, -492, ..., -28, -12<br>12, 28, ..., 492, 508, 516, ..., 996, 1012 |
| 80+80 MHz | 4 | -500(L), -496(L), ..., -8(L), -4(L), 4(L), 8(L), ..., 496(L), 500(L)<br>-500(H), -496(H), ..., -8(H), -4(H), 4(H), 8(H), ..., 496(H), 500(H) |
| | 16 | -500(L), -484(L), ..., -20(L), -4(L), 4(L), 20(L), ..., 484(L), 500(L)<br>-500(H), -484(H), ..., -20(H), -4(H), 4(H), 20(H), ..., 484(H), 500(H) |

| BANDWIDTH | Ng | SUPERSET OF SUBCARRIER INDICES |
|---|---|---|
| 240/80+160 MHz | 4 | -500(L), -496(L), ..., -8(L), -4(L), 4(L), 8(L), ..., 496(L), 500(L)<br>-500(M), -496(M), ..., -8(M), -4(M), 4(M), 8(M), ..., 496(M), 500(M)<br>-500(H), -496(H), ..., -8(H), -4(H), 4(H), 8(H), ..., 496(H), 500(H) |
| | 16 | -500(L), -484(L), ..., -20(L), -4(L), 4(L), 20(L), ..., 484(L), 500(L)<br>-500(M), -484(M), ..., -20(M), -4(M), 4(M), 20(M), ..., 484(M), 500(M)<br>-500(H), -484(H), ..., -20(H), -4(H), 4(H), 20(H), ..., 484(H), 500(H) |

| BANDWIDTH | Ng | SUPERSET OF SUBCARRIER INDICES |
|---|---|---|
| 320/160+160 MHz | 4 | -500(LL), -496(LL), ..., -8(LL), -4(LL), 4(LL), 8(LL), ..., 496(LL), 500(LL)<br>-500(LH), -496(LH), ..., -8(LH), -4(LH), 4(LH), 8(LH), ..., 496(LH), 500(LH)<br>-500(HL), -496(HL), ..., -8(HL), -4(HL), 4(HL), 8(HL), ..., 496(HL), 500(HL)<br>-500(HH), -496(HH), ..., -8(HH), -4(HH), 4(HH), 8(HH), ..., 496(H), 500(HH) |
| | 16 | -500(LL), -484(LL), ..., -20(LL), -4(LL), 4(LL), 20(LL), ..., 484(LL), 500(LL)<br>-500(LH), -484(LH), ..., -20(LH), -4(LH), 4(LH), 20(LH), ..., 484(LH), 500(LH)<br>-500(HL), -484(HL), ..., -20(HL), -4(HL), 4(HL), 20(HL), ..., 484(HL), 500(HL)<br>-500(HH), -484(HH), ..., -20(HH), -4(HH), 4(HH), 20(HH), ..., 484(HH), 500(HH) |

| RU INDEX | BANDWIDTH | | | | | | | |
|---|---|---|---|---|---|---|---|---|
| | 80 MHz | | 160/80 + 80 MHz | | 240/80 + 160 MHz | | 320/160 + 160 MHz | |
| | S | E | S | E | S | E | S | E |
| 0 | -500 | -472 | -500 (L) | -472 (L) | -500 (L) | -472 (L) | -500 (LL) | -472 (LL) |
| 1 | -476 | -448 | -476 (L) | -448 (L) | -476 (L) | -448 (L) | -476 (LL) | -448 (LL) |
| 2 | -448 | -420 | -448 (L) | -420 (L) | -448 (L) | -420 (L) | -448 (LL) | -420 (LL) |
| 3 | -420 | -392 | -420 (L) | -392 (L) | -420 (L) | -392 (L) | -420 (LL) | -392 (LL) |
| 4 | -392 | -364 | -392 (L) | -364 (L) | -392 (L) | -364 (L) | -392 (LL) | -364 (LL) |
| 5 | -368 | -340 | -368 (L) | -340 (L) | -368 (L) | -340 (L) | -368 (LL) | -340 (LL) |
| 6 | -340 | -312 | -340 (L) | -312 (L) | -340 (L) | -312 (L) | -340 (LL) | -312 (LL) |
| 7 | -312 | -284 | -312 (L) | -284 (L) | -312 (L) | -284 (L) | -312 (LL) | -284 (LL) |
| 8 | -288 | -260 | -288 (L) | -260 (L) | -288 (L) | -260 (L) | -288 (LL) | -260 (LL) |
| 9 | -252 | -224 | -252 (L) | -224 (L) | -252 (L) | -224 (L) | -252 (LL) | -224 (LL) |
| 10 | -228 | -200 | -228 (L) | -200 (L) | -228 (L) | -200 (L) | -228 (LL) | -200 (LL) |
| 11 | -200 | -172 | -200 (L) | -172 (L) | -200 (L) | -172 (L) | -200 (LL) | -172 (LL) |
| 12 | -172 | -144 | -172 (L) | -144 (L) | -172 (L) | -144 (L) | -172 (LL) | -144 (LL) |
| 13 | -148 | -120 | -148 (L) | -120 (L) | -148 (L) | -120 (L) | -148 (LL) | -120 (LL) |
| 14 | -120 | -92 | -120 (L) | -92 (L) | -120 (L) | -92 (L) | -120 (LL) | -92 (LL) |
| 15 | -92 | -64 | -92 (L) | -64 (L) | -92 (L) | -64 (L) | -92 (LL) | -64 (LL) |
| 16 | -64 | -36 | -64 (L) | -36 (L) | -64 (L) | -36 (L) | -64 (LL) | -36 (LL) |
| 17 | -40 | -12 | -40 (L) | -12 (L) | -40 (L) | -12 (L) | -40 (LL) | -12 (LL) |
| 18 | 12 | 40 | 12 (L) | 40 (L) | 12 (L) | 40 (L) | 12 (LL) | 40 (LL) |
| 19 | 36 | 64 | 36 (L) | 64 (L) | 36 (L) | 64 (L) | 36 (LL) | 64 (LL) |
| 20 | 64 | 92 | 64 (L) | 92 (L) | 64 (L) | 92 (L) | 64 (LL) | 92 (LL) |
| 21 | 92 | 120 | 92 (L) | 120 (L) | 92 (L) | 120 (L) | 92 (LL) | 120 (LL) |
| 22 | 120 | 148 | 120 (L) | 148 (L) | 120 (L) | 148 (L) | 120 (LL) | 148 (LL) |
| 23 | 144 | 172 | 144 (L) | 172 (L) | 144 (L) | 172 (L) | 144 (LL) | 172 (LL) |

| | | | | | | | | |
|---|---|---|---|---|---|---|---|---|
| 24 | 172 | 200 | 172 (L) | 200 (L) | 172 (L) | 200 (L) | 172 (LL) | 200 (LL) |
| 25 | 200 | 228 | 200 (L) | 228 (L) | 200 (L) | 228 (L) | 200 (LL) | 228 (LL) |
| 26 | 224 | 252 | 224 (L) | 252 (L) | 224 (L) | 252 (L) | 224 (LL) | 252 (LL) |
| 27 | 260 | 288 | 260 (L) | 288 (L) | 260 (L) | 288 (L) | 260 (LL) | 288 (LL) |
| 28 | 284 | 312 | 284 (L) | 312 (L) | 284 (L) | 312 (L) | 284 (LL) | 312 (LL) |
| 29 | 312 | 340 | 312 (L) | 340 (L) | 312 (L) | 340 (L) | 312 (LL) | 340 (LL) |
| 30 | 340 | 368 | 340 (L) | 368 (L) | 340 (L) | 368 (L) | 340 (LL) | 368 (LL) |
| 31 | 364 | 392 | 364 (L) | 392 (L) | 364 (L) | 392 (L) | 364 (LL) | 392 (LL) |
| 32 | 392 | 420 | 392 (L) | 420 (L) | 392 (L) | 420 (L) | 392 (LL) | 420 (LL) |
| 33 | 420 | 448 | 420 (L) | 448 (L) | 420 (L) | 448 (L) | 420 (LL) | 448 (LL) |
| 34 | 448 | 476 | 448 (L) | 476 (L) | 448 (L) | 476 (L) | 448 (LL) | 476 (LL) |
| 35 | 472 | 500 | 472 (L) | 500 (L) | 472 (L) | 500 (L) | 472 (LL) | 500 (LL) |
| 36 | | | -500 (H) | -472 (H) | -500 (M) | -472 (M) | -500 (LH) | -472 (LH) |
| 37 | | | -476 (H) | -448 (H) | -476 (M) | -448 (M) | -476 (LH) | -448 (LH) |
| 38 | | | -448 (H) | -420 (H) | -448 (M) | -420 (M) | -448 (LH) | -420 (LH) |
| 39 | | | -420 (H) | -392 (H) | -420 (M) | -392 (M) | -420 (LH) | -392 (LH) |
| 40 | | | -392 (H) | -364 (H) | -392 (M) | -364 (M) | -392 (LH) | -364 (LH) |
| 41 | | | -368 (H) | -340 (H) | -368 (M) | -340 (M) | -368 (LH) | -340 (LH) |
| 42 | | | -340 (H) | -312 (H) | -340 (M) | -312 (M) | -340 (LH) | -312 (LH) |
| 43 | | | -312 (H) | -284 (H) | -312 (M) | -284 (M) | -312 (LH) | -284 (LH) |
| 44 | | | -288 (H) | -260 (H) | -288 (M) | -260 (M) | -288 (LH) | -260 (LH) |
| 45 | | | -252 (H) | -224 (H) | -252 (M) | -224 (M) | -252 (LH) | -224 (LH) |
| 46 | | | -228 (H) | -200 (H) | -228 (M) | -200 (M) | -228 (LH) | -200 (LH) |
| 47 | | | -200 (H) | -172 (H) | -200 (M) | -172 (M) | -200 (LH) | -172 (LH) |
| 48 | | | -172 (H) | -144 (H) | -172 (M) | -144 (M) | -172 (LH) | -144 (LH) |
| 49 | | | -148 (H) | -120 (H) | -148 (M) | -120 (M) | -148 (LH) | -120 (LH) |
| 50 | | | -120 (H) | -92 (H) | -120 (M) | -92 (M) | -120 (LH) | -92 (LH) |
| 51 | | | -92 (H) | -64 (H) | -92 (M) | -64 (M) | -92 (LH) | -64 (LH) |
| 52 | | | -64 (H) | -36 (H) | -64 (M) | -36 (M) | -64 (LH) | -36 (LH) |
| 53 | | | -40 (H) | -12 (H) | -40 (M) | -12 (M) | -40 (LH) | -12 (LH) |

| | | | | | | | | |
|---|---|---|---|---|---|---|---|---|
| 54 | | | 12 (H) | 40 (H) | 12 (M) | 40 (M) | 12 (LH) | 40 (LH) |
| 55 | | | 36 (H) | 64 (H) | 36 (M) | 64 (M) | 36 (LH) | 64 (LH) |
| 56 | | | 64 (H) | 92 (H) | 64 (M) | 92 (M) | 64 (LH) | 92 (LH) |
| 57 | | | 92 (H) | 120 (H) | 92 (M) | 120 (M) | 92 (LH) | 120 (LH) |
| 58 | | | 120 (H) | 148 (H) | 120 (M) | 148 (M) | 120 (LH) | 148 (LH) |
| 59 | | | 144 (H) | 172 (H) | 144 (M) | 172 (M) | 144 (LH) | 172 (LH) |
| 60 | | | 172 (H) | 200 (H) | 172 (M) | 200 (M) | 172 (LH) | 200 (LH) |
| 61 | | | 200 (H) | 228 (H) | 200 (M) | 228 (M) | 200 (LH) | 228 (LH) |
| 62 | | | 224 (H) | 252 (H) | 224 (M) | 252 (M) | 224 (LH) | 252 (LH) |
| 63 | | | 260 (H) | 288 (H) | 260 (M) | 288 (M) | 260 (LH) | 288 (LH) |
| 64 | | | 284 (H) | 312 (H) | 284 (M) | 312 (M) | 284 (LH) | 312 (LH) |
| 65 | | | 312 (H) | 340 (H) | 312 (M) | 340 (M) | 312 (LH) | 340 (LH) |
| 66 | | | 340 (H) | 368 (H) | 340 (M) | 368 (M) | 340 (LH) | 368 (LH) |
| 67 | | | 364 (H) | 392 (H) | 364 (M) | 392 (M) | 364 (LH) | 392 (LH) |
| 68 | | | 392 (H) | 420 (H) | 392 (M) | 420 (M) | 392 (LH) | 420 (LH) |
| 69 | | | 420 (H) | 448 (H) | 420 (M) | 448 (M) | 420 (LH) | 448 (LH) |
| 70 | | | 448 (H) | 476 (H) | 448 (M) | 476 (M) | 448 (LH) | 476 (LH) |
| 71 | | | 472 (H) | 500 (H) | 472 (M) | 500 (M) | 472 (LH) | 500 (LH) |
| 72 | | | | | -500 (H) | -472 (H) | -500 (HL) | -472 (HL) |
| 73 | | | | | -476 (H) | -448 (H) | -476 (HL) | -448 (HL) |
| 74 | | | | | -448 (H) | -420 (H) | -448 (HL) | -420 (HL) |
| 75 | | | | | -420 (H) | -392 (H) | -420 (HL) | -392 (HL) |
| 76 | | | | | -392 (H) | -364 (H) | -392 (HL) | -364 (HL) |
| 77 | | | | | -368 (H) | -340 (H) | -368 (HL) | -340 (HL) |
| 78 | | | | | -340 (H) | -312 (H) | -340 (HL) | -312 (HL) |
| 79 | | | | | -312 (H) | -284 (H) | -312 (HL) | -284 (HL) |
| 80 | | | | | -288 (H) | -260 (H) | -288 (HL) | -260 (HL) |
| 81 | | | | | -252 (H) | -224 (H) | -252 (HL) | -224 (HL) |
| 82 | | | | | -228 (H) | -200 (H) | -228 (HL) | -200 (HL) |
| 83 | | | | | -200 (H) | -172 (H) | -200 (HL) | -172 (HL) |

| | | | | | | | | |
|---|---|---|---|---|---|---|---|---|
| 84 | | | | | -172 (H) | -144 (H) | -172 (HL) | -144 (HL) |
| 85 | | | | | -148 (H) | -120 (H) | -148 (HL) | -120 (HL) |
| 86 | | | | | -120 (H) | -92 (H) | -120 (HL) | -92 (HL) |
| 87 | | | | | -92 (H) | -64 (H) | -92 (HL) | -64 (HL) |
| 88 | | | | | -64 (H) | -36 (H) | -64 (HL) | -36 (HL) |
| 89 | | | | | -40 (H) | -12 (H) | -40 (HL) | -12 (HL) |
| 90 | | | | | 12 (H) | 40 (H) | 12 (HL) | 40 (HL) |
| 91 | | | | | 36 (H) | 64 (H) | 36 (HL) | 64 (HL) |
| 92 | | | | | 64 (H) | 92 (H) | 64 (HL) | 92 (HL) |
| 93 | | | | | 92 (H) | 120 (H) | 92 (HL) | 120 (HL) |
| 94 | | | | | 120 (H) | 148 (H) | 120 (HL) | 148 (HL) |
| 95 | | | | | 144 (H) | 172 (H) | 144 (HL) | 172 (HL) |
| 96 | | | | | 172 (H) | 200 (H) | 172 (HL) | 200 (HL) |
| 97 | | | | | 200 (H) | 228 (H) | 200 (HL) | 228 (HL) |
| 98 | | | | | 224 (H) | 252 (H) | 224 (HL) | 252 (HL) |
| 99 | | | | | 260 (H) | 288 (H) | 260 (HL) | 288 (HL) |
| 100 | | | | | 284 (H) | 312 (H) | 284 (HL) | 312 (HL) |
| 101 | | | | | 312 (H) | 340 (H) | 312 (HL) | 340 (HL) |
| 102 | | | | | 340 (H) | 368 (H) | 340 (HL) | 368 (HL) |
| 103 | | | | | 364 (H) | 392 (H) | 364 (HL) | 392 (HL) |
| 104 | | | | | 392 (H) | 420 (H) | 392 (HL) | 420 (HL) |
| 105 | | | | | 420 (H) | 448 (H) | 420 (HL) | 448 (HL) |
| 106 | | | | | 448 (H) | 476 (H) | 448 (HL) | 476 (HL) |
| 107 | | | | | 472 (H) | 500 (H) | 472 (HL) | 500 (HL) |
| 108 | | | | | | | -500 (HH) | -472 (HH) |
| 109 | | | | | | | -476 (HH) | -448 (HH) |
| 110 | | | | | | | -448 (HH) | -420 (HH) |
| 111 | | | | | | | -420 (HH) | -392 (HH) |
| 112 | | | | | | | -392 (HH) | -364 (HH) |
| 113 | | | | | | | -368 (HH) | -340 (HH) |

| | | | | | | | | |
|---|---|---|---|---|---|---|---|---|
| 114 | | | | | | | -340 (HH) | -312 (HH) |
| 115 | | | | | | | -312 (HH) | -284 (HH) |
| 116 | | | | | | | -288 (HH) | -260 (HH) |
| 117 | | | | | | | -252 (HH) | -224 (HH) |
| 118 | | | | | | | -228 (HH) | -200 (HH) |
| 119 | | | | | | | -200 (HH) | -172 (HH) |
| 120 | | | | | | | -172 (HH) | -144 (HH) |
| 121 | | | | | | | -148 (HH) | -120 (HH) |
| 122 | | | | | | | -120 (HH) | -92 (HH) |
| 123 | | | | | | | -92 (HH) | -64 (HH) |
| 124 | | | | | | | -64 (HH) | -36 (HH) |
| 125 | | | | | | | -40 (HH) | -12 (HH) |
| 126 | | | | | | | 12 (HH) | 40 (HH) |
| 127 | | | | | | | 36 (HH) | 64 (HH) |
| 128 | | | | | | | 64 (HH) | 92 (HH) |
| 129 | | | | | | | 92 (HH) | 120 (HH) |
| 130 | | | | | | | 120 (HH) | 148 (HH) |
| 131 | | | | | | | 144 (HH) | 172 (HH) |
| 132 | | | | | | | 172 (HH) | 200 (HH) |
| 133 | | | | | | | 200 (HH) | 228 (HH) |
| 134 | | | | | | | 224 (HH) | 252 (HH) |
| 135 | | | | | | | 260 (HH) | 288 (HH) |
| 136 | | | | | | | 284 (HH) | 312 (HH) |
| 137 | | | | | | | 312 (HH) | 340 (HH) |
| 138 | | | | | | | 340 (HH) | 368 (HH) |
| 139 | | | | | | | 364 (HH) | 392 (HH) |
| 140 | | | | | | | 392 (HH) | 420 (HH) |
| 141 | | | | | | | 420 (HH) | 448 (HH) |
| 142 | | | | | | | 448 (HH) | 476 (HH) |
| 143 | | | | | | | 472 (HH) | 500 (HH) |

| RU INDEX | BANDWIDTH | | | | | | | |
|---|---|---|---|---|---|---|---|---|
| | 80 MHz | | 160/80 + 80 MHz | | 240/80 + 160 MHz | | 320/160 + 160 MHz | |
| | S | E | S | E | S | E | S | E |
| 0 | -500 | -468 | -500 (L) | -468 (L) | -500 (L) | -468 (L) | -500 (LL) | -468 (LL) |
| 1 | -484 | -436 | -484 (L) | -436 (L) | -484 (L) | -436 (L) | -484 (LL) | -436 (LL) |
| 2 | -452 | -420 | -452 (L) | -420 (L) | -452 (L) | -420 (L) | -452 (LL) | -420 (LL) |
| 3 | -420 | -388 | -420 (L) | -388 (L) | -420 (L) | -388 (L) | -420 (LL) | -388 (LL) |
| 4 | -404 | -356 | -404 (L) | -356 (L) | -404 (L) | -356 (L) | -404 (LL) | -356 (LL) |
| 5 | -372 | -340 | -372 (L) | -340 (L) | -372 (L) | -340 (L) | -372 (LL) | -340 (LL) |
| 6 | -340 | -308 | -340 (L) | -308 (L) | -340 (L) | -308 (L) | -340 (LL) | -308 (LL) |
| 7 | -324 | -276 | -324 (L) | -276 (L) | -324 (L) | -276 (L) | -324 (LL) | -276 (LL) |
| 8 | -292 | -260 | -292 (L) | -260 (L) | -292 (L) | -260 (L) | -292 (LL) | -260 (LL) |
| 9 | -260 | -212 | -260 (L) | -212 (L) | -260 (L) | -212 (L) | -260 (LL) | -212 (LL) |
| 10 | -228 | -196 | -228 (L) | -196 (L) | -228 (L) | -196 (L) | -228 (LL) | -196 (LL) |
| 11 | -212 | -164 | -212 (L) | -164 (L) | -212 (L) | -164 (L) | -212 (LL) | -164 (LL) |
| 12 | -180 | -132 | -180 (L) | -132 (L) | -180 (L) | -132 (L) | -180 (LL) | -132 (LL) |
| 13 | -148 | -116 | -148 (L) | -116 (L) | -148 (L) | -116 (L) | -148 (LL) | -116 (LL) |
| 14 | -132 | -84 | -132 (L) | -84 (L) | -132 (L) | -84 (L) | -132 (LL) | -84 (LL) |
| 15 | -100 | -52 | -100 (L) | -52 (L) | -100 (L) | -52 (L) | -100 (LL) | -52 (LL) |
| 16 | -68 | -36 | -68 (L) | -36 (L) | -68 (L) | -36 (L) | -68 (LL) | -36 (LL) |
| 17 | -52 | -4 | -52 (L) | -4 (L) | -52 (L) | -4 (L) | -52 (LL) | -4 (LL) |
| 18 | 4 | 52 | 4 (L) | 52 (L) | 4 (L) | 52 (L) | 4 (LL) | 52 (LL) |
| 19 | 36 | 68 | 36 (L) | 68 (L) | 36 (L) | 68 (L) | 36 (LL) | 68 (LL) |
| 20 | 52 | 100 | 52 (L) | 100 (L) | 52 (L) | 100 (L) | 52 (LL) | 100 (LL) |
| 21 | 84 | 132 | 84 (L) | 132 (L) | 84 (L) | 132 (L) | 84 (LL) | 132 (LL) |
| 22 | 116 | 148 | 116 (L) | 148 (L) | 116 (L) | 148 (L) | 116 (LL) | 148 (LL) |
| 23 | 132 | 180 | 132 (L) | 180 (L) | 132 (L) | 180 (L) | 132 (LL) | 180 (LL) |

| | | | | | | | | |
|---|---|---|---|---|---|---|---|---|
| 24 | 164 | 212 | 164 (L) | 212 (L) | 164 (L) | 212 (L) | 164 (LL) | 212 (LL) |
| 25 | 196 | 228 | 196 (L) | 228 (L) | 196 (L) | 228 (L) | 196 (LL) | 228 (LL) |
| 26 | 212 | 260 | 212 (L) | 260 (L) | 212 (L) | 260 (L) | 212 (LL) | 260 (LL) |
| 27 | 260 | 292 | 260 (L) | 292 (L) | 260 (L) | 292 (L) | 260 (LL) | 292 (LL) |
| 28 | 276 | 324 | 276 (L) | 324 (L) | 276 (L) | 324 (L) | 276 (LL) | 324 (LL) |
| 29 | 308 | 340 | 308 (L) | 340 (L) | 308 (L) | 340 (L) | 308 (LL) | 340 (LL) |
| 30 | 340 | 372 | 340 (L) | 372 (L) | 340 (L) | 372 (L) | 340 (LL) | 372 (LL) |
| 31 | 356 | 404 | 356 (L) | 404 (L) | 356 (L) | 404 (L) | 356 (LL) | 404 (LL) |
| 32 | 388 | 420 | 388 (L) | 420 (L) | 388 (L) | 420 (L) | 388 (LL) | 420 (LL) |
| 33 | 420 | 452 | 420 (L) | 452 (L) | 420 (L) | 452 (L) | 420 (LL) | 452 (LL) |
| 34 | 436 | 484 | 436 (L) | 484 (L) | 436 (L) | 484 (L) | 436 (LL) | 484 (LL) |
| 35 | 468 | 500 | 468 (L) | 500 (L) | 468 (L) | 500 (L) | 468 (LL) | 500 (LL) |
| 36 | | | -500 (H) | -468 (H) | -500 (M) | -468 (M) | -500 (LH) | -468 (LH) |
| 37 | | | -484 (H) | -436 (H) | -484 (M) | -436 (M) | -484 (LH) | -436 (LH) |
| 38 | | | -452 (H) | -420 (H) | -452 (M) | -420 (M) | -452 (LH) | -420 (LH) |
| 39 | | | -420 (H) | -388 (H) | -420 (M) | -388 (M) | -420 (LH) | -388 (LH) |
| 40 | | | -404 (H) | -356 (H) | -404 (M) | -356 (M) | -404 (LH) | -356 (LH) |
| 41 | | | -372 (H) | -340 (H) | -372 (M) | -340 (M) | -372 (LH) | -340 (LH) |
| 42 | | | -340 (H) | -308 (H) | -340 (M) | -308 (M) | -340 (LH) | -308 (LH) |
| 43 | | | -324 (H) | -276 (H) | -324 (M) | -276 (M) | -324 (LH) | -276 (LH) |
| 44 | | | -292 (H) | -260 (H) | -292 (M) | -260 (M) | -292 (LH) | -260 (LH) |
| 45 | | | -260 (H) | -212 (H) | -260 (M) | -212 (M) | -260 (LH) | -212 (LH) |
| 46 | | | -228 (H) | -196 (H) | -228 (M) | -196 (M) | -228 (LH) | -196 (LH) |
| 47 | | | -212 (H) | -164 (H) | -212 (M) | -164 (M) | -212 (LH) | -164 (LH) |
| 48 | | | -180 (H) | -132 (H) | -180 (M) | -132 (M) | -180 (LH) | -132 (LH) |
| 49 | | | -148 (H) | -116 (H) | -148 (M) | -116 (M) | -148 (LH) | -116 (LH) |
| 50 | | | -132 (H) | -84 (H) | -132 (M) | -84 (M) | -132 (LH) | -84 (LH) |
| 51 | | | -100 (H) | -52 (H) | -100 (M) | -52 (M) | -100 (LH) | -52 (LH) |
| 52 | | | -68 (H) | -36 (H) | -68 (M) | -36 (M) | -68 (LH) | -36 (LH) |
| 53 | | | -52 (H) | -4 (H) | -52 (M) | -4 (M) | -52 (LH) | -4 (LH) |

| | | | | | | | | |
|---|---|---|---|---|---|---|---|---|
| 54 | | | 4 (H) | 52 (H) | 4 (M) | 52 (M) | 4 (LH) | 52 (LH) |
| 55 | | | 36 (H) | 68 (H) | 36 (M) | 68 (M) | 36 (LH) | 68 (LH) |
| 56 | | | 52 (H) | 100 (H) | 52 (M) | 100 (M) | 52 (LH) | 100 (LH) |
| 57 | | | 84 (H) | 132 (H) | 84 (M) | 132 (M) | 84 (LH) | 132 (LH) |
| 58 | | | 116 (H) | 148 (H) | 116 (M) | 148 (M) | 116 (LH) | 148 (LH) |
| 59 | | | 132 (H) | 180 (H) | 132 (M) | 180 (M) | 132 (LH) | 180 (LH) |
| 60 | | | 164 (H) | 212 (H) | 164 (M) | 212 (M) | 164 (LH) | 212 (LH) |
| 61 | | | 196 (H) | 228 (H) | 196 (M) | 228 (M) | 196 (LH) | 228 (LH) |
| 62 | | | 212 (H) | 260 (H) | 212 (M) | 260 (M) | 212 (LH) | 260 (LH) |
| 63 | | | 260 (H) | 292 (H) | 260 (M) | 292 (M) | 260 (LH) | 292 (LH) |
| 64 | | | 276 (H) | 324 (H) | 276 (M) | 324 (M) | 276 (LH) | 324 (LH) |
| 65 | | | 308 (H) | 340 (H) | 308 (M) | 340 (M) | 308 (LH) | 340 (LH) |
| 66 | | | 340 (H) | 372 (H) | 340 (M) | 372 (M) | 340 (LH) | 372 (LH) |
| 67 | | | 356 (H) | 404 (H) | 356 (M) | 404 (M) | 356 (LH) | 404 (LH) |
| 68 | | | 388 (H) | 420 (H) | 388 (M) | 420 (M) | 388 (LH) | 420 (LH) |
| 69 | | | 420 (H) | 452 (H) | 420 (M) | 452 (M) | 420 (LH) | 452 (LH) |
| 70 | | | 436 (H) | 484 (H) | 436 (M) | 484 (M) | 436 (LH) | 484 (LH) |
| 71 | | | 468 (H) | 500 (H) | 468 (M) | 500 (M) | 468 (LH) | 500 (LH) |
| 72 | | | | | -500 (H) | -468 (H) | -500 (HL) | -468 (HL) |
| 73 | | | | | -484 (H) | -436 (H) | -484 (HL) | -436 (HL) |
| 74 | | | | | -452 (H) | -420 (H) | -452 (HL) | -420 (HL) |
| 75 | | | | | -420 (H) | -388 (H) | -420 (HL) | -388 (HL) |
| 76 | | | | | -404 (H) | -356 (H) | -404 (HL) | -356 (HL) |
| 77 | | | | | -372 (H) | -340 (H) | -372 (HL) | -340 (HL) |
| 78 | | | | | -340 (H) | -308 (H) | -340 (HL) | -308 (HL) |
| 79 | | | | | -324 (H) | -276 (H) | -324 (HL) | -276 (HL) |
| 80 | | | | | -292 (H) | -260 (H) | -292 (HL) | -260 (HL) |
| 81 | | | | | -260 (H) | -212 (H) | -260 (HL) | -212 (HL) |
| 82 | | | | | -228 (H) | -196 (H) | -228 (HL) | -196 (HL) |
| 83 | | | | | -212 (H) | -164 (H) | -212 (HL) | -164 (HL) |

| | | | | | | | | |
|---|---|---|---|---|---|---|---|---|
| 84 | | | | | -180 (H) | -132 (H) | -180 (HL) | -132 (HL) |
| 85 | | | | | -148 (H) | -116 (H) | -148 (HL) | -116 (HL) |
| 86 | | | | | -132 (H) | -84 (H) | -132 (HL) | -84 (HL) |
| 87 | | | | | -100 (H) | -52 (H) | -100 (HL) | -52 (HL) |
| 88 | | | | | -68 (H) | -36 (H) | -68 (HL) | -36 (HL) |
| 89 | | | | | -52 (H) | -4 (H) | -52 (HL) | -4 (HL) |
| 90 | | | | | 4 (H) | 52 (H) | 4 (HL) | 52 (HL) |
| 91 | | | | | 36 (H) | 68 (H) | 36 (HL) | 68 (HL) |
| 92 | | | | | 52 (H) | 100 (H) | 52 (HL) | 100 (HL) |
| 93 | | | | | 84 (H) | 132 (H) | 84 (HL) | 132 (HL) |
| 94 | | | | | 116 (H) | 148 (H) | 116 (HL) | 148 (HL) |
| 95 | | | | | 132 (H) | 180 (H) | 132 (HL) | 180 (HL) |
| 96 | | | | | 164 (H) | 212 (H) | 164 (HL) | 212 (HL) |
| 97 | | | | | 196 (H) | 228 (H) | 196 (HL) | 228 (HL) |
| 98 | | | | | 212 (H) | 260 (H) | 212 (HL) | 260 (HL) |
| 99 | | | | | 260 (H) | 292 (H) | 260 (HL) | 292 (HL) |
| 100 | | | | | 276 (H) | 324 (H) | 276 (HL) | 324 (HL) |
| 101 | | | | | 308 (H) | 340 (H) | 308 (HL) | 340 (HL) |
| 102 | | | | | 340 (H) | 372 (H) | 340 (HL) | 372 (HL) |
| 103 | | | | | 356 (H) | 404 (H) | 356 (HL) | 404 (HL) |
| 104 | | | | | 388 (H) | 420 (H) | 388 (HL) | 420 (HL) |
| 105 | | | | | 420 (H) | 452 (H) | 420 (HL) | 452 (HL) |
| 106 | | | | | 436 (H) | 484 (H) | 436 (HL) | 484 (HL) |
| 107 | | | | | 468 (H) | 500 (H) | 468 (HL) | 500 (HL) |
| 108 | | | | | | | -500 (HH) | -468 (HH) |
| 109 | | | | | | | -484 (HH) | -436 (HH) |
| 110 | | | | | | | -452 (HH) | -420 (HH) |
| 111 | | | | | | | -420 (HH) | -388 (HH) |
| 112 | | | | | | | -404 (HH) | -356 (HH) |
| 113 | | | | | | | -372 (HH) | -340 (HH) |

| | | | | | | | | |
|---|---|---|---|---|---|---|---|---|
| 114 | | | | | | | -340 (HH) | -308 (HH) |
| 115 | | | | | | | -324 (HH) | -276 (HH) |
| 116 | | | | | | | -292 (HH) | -260 (HH) |
| 117 | | | | | | | -260 (HH) | -212 (HH) |
| 118 | | | | | | | -228 (HH) | -196 (HH) |
| 119 | | | | | | | -212 (HH) | -164 (HH) |
| 120 | | | | | | | -180 (HH) | -132 (HH) |
| 121 | | | | | | | -148 (HH) | -116 (HH) |
| 122 | | | | | | | -132 (HH) | -84 (HH) |
| 123 | | | | | | | -100 (HH) | -52 (HH) |
| 124 | | | | | | | -68 (HH) | -36 (HH) |
| 125 | | | | | | | -52 (HH) | -4 (HH) |
| 126 | | | | | | | 4 (HH) | 52 (HH) |
| 127 | | | | | | | 36 (HH) | 68 (HH) |
| 128 | | | | | | | 52 (HH) | 100 (HH) |
| 129 | | | | | | | 84 (HH) | 132 (HH) |
| 130 | | | | | | | 116 (HH) | 148 (HH) |
| 131 | | | | | | | 132 (HH) | 180 (HH) |
| 132 | | | | | | | 164 (HH) | 212 (HH) |
| 133 | | | | | | | 196 (HH) | 228 (HH) |
| 134 | | | | | | | 212 (HH) | 260 (HH) |
| 135 | | | | | | | 260 (HH) | 292 (HH) |
| 136 | | | | | | | 276 (HH) | 324 (HH) |
| 137 | | | | | | | 308 (HH) | 340 (HH) |
| 138 | | | | | | | 340 (HH) | 372 (HH) |
| 139 | | | | | | | 356 (HH) | 404 (HH) |
| 140 | | | | | | | 388 (HH) | 420 (HH) |
| 141 | | | | | | | 420 (HH) | 452 (HH) |
| 142 | | | | | | | 436 (HH) | 484 (HH) |
| 143 | | | | | | | 468 (HH) | 500 (HH) |

| BANDWIDTH | Ng | SUPERSET OF SUBCARRIER INDICES |
|---|---|---|
| 80 MHz | 16 | -500, -484 ..., -276,-260, -252, -236, -220, ..., -28, -12, -4, 4, 12, 28, ..., 220, 236, 252, 260, 276, ..., 484, 500 |
| 160 MHz | 16 | -1012, -996, ..., -788, -772, -764, -748, -732 ..., -540, -524, -516, -508, -500, -484, ..., -292, -276, -260, -252, -236, ..., -28, -12<br>12, 28, ..., 236, 252, 260, 276, 292, ..., 484, 500, 508, 516, 524, 540 ..., 732, 748, 764, 772, 788, ..., 996, 1012 |
| 80+80 MHz | 16 | -500(L), -484(L), ..., -276(L), -260(L), -252(L), -236(L), -220(L), ..., -28(L), -12(L), -4(L), 4(L), 12(L), 28(L), ..., 220(L), 236(L), 252(L), 260(L), 276(L), ..., 484(L), 500(L)<br>-500(H), -484(H), ..., -276(H), -260(H), -252(H), -236(H), -220(H), ..., -28(H), -12(H), -4(H), 4(H), 12(H), 28(H), ..., 220(H), 236(H), 252(H), 260(H), 276(H), ..., 484(H), 500(H) |
| 240/80+160 MHz | 16 | -500(L), -484(L), ..., -276(L), -260(L), -252(L), -236(L), -220(L), ..., -28(L), -12(L), -4(L), 4(L), 12(L), 28(L), ..., 220(L), 236(L), 252(L), 260(L), 276(L), ..., 484(L), 500(L)<br>-500(M), -484(M), ..., -276(M), -260(M), -252(M), -236(M), -220(M), ..., -28(M), -12(M), -4(M), 4(M), 12(M), 28(M), ..., 220(M), 236(M), 252(M), 260(M), 276(M), ..., 484(M), 500(M)<br>-500(H), -484(H), ..., -276(H), -260(H), -252(H), -236(H), -220(H), ..., -28(H), -12(H), -4(H), 4(H), 12(H), 28(H), ..., 220(H), 236(H), 252(H), 260(H), 276(H), ..., 484(H), 500(H) |
| 320/160+160 MHz | 16 | -500(LL), -484(LL), ..., -276(LL), -260(LL), -252(LL), -236(LL), -220(LL), ..., -28(LL), -12(LL), -4(LL), 4(LL), 12(LL), 28(LL), ..., 220(LL), 236(LL), 252(LL), 260(LL), 276(LL), ..., 484(LL), 500(LL)<br>-500(LH), -484(LH), ..., -276(LH), -260(LH), -252(LH), -236(LH), -220(LH), ..., -28(LH), -12(LH), -4(LH), 4(LH), 12(LH), 28(LH), ..., 220(LH), 236(LH), 252(LH), 260(LH), 276(LH), ..., 484(LH), 500(LH)<br>-500(HL), -484(HL), ..., -276(HL), -260(HL), -252(HL), -236(HL), -220(HL), ..., -28(HL), -12(HL), -4(HL), 4(HL), 12(HL), 28(HL), ..., 220(HL), 236(HL), 252(HL), 260(HL), 276(HL), ..., 484(HL), 500(HL)<br>-500(HH), -484(HH), ..., -276(HH), -260(HH), -252(HH), -236(HH), -220(HH), ..., -28(HH), -12(HH), -4(HH), 4(HH), 12(HH), 28(HH), ..., 220(HH), 236(HH), 252(HH), 260(HH), 276(HH), ..., 484(HH), 500(HH) |

| RU INDEX | BANDWIDTH | | | | | | | |
|---|---|---|---|---|---|---|---|---|
| | 80 MHz | | 160/80 + 80 MHz | | 240/80 + 160 MHz | | 320/160 + 160 MHz | |
| | S | E | S | E | S | E | S | E |
| 0 | -500 | -468 | -500 (L) | -468 (L) | -500 (L) | -468 (L) | -500 (LL) | -468 (LL) |
| 1 | -484 | -436 | -484 (L) | -436 (L) | -484 (L) | -436 (L) | -484 (LL) | -436 (LL) |
| 2 | -452 | -420 | -452 (L) | -420 (L) | -452 (L) | -420 (L) | -452 (LL) | -420 (LL) |
| 3 | -420 | -388 | -420 (L) | -388 (L) | -420 (L) | -388 (L) | -420 (LL) | -388 (LL) |
| 4 | -404 | -356 | -404 (L) | -356 (L) | -404 (L) | -356 (L) | -404 (LL) | -356 (LL) |
| 5 | -372 | -340 | -372 (L) | -340 (L) | -372 (L) | -340 (L) | -372 (LL) | -340 (LL) |
| 6 | -340 | -308 | -340 (L) | -308 (L) | -340 (L) | -308 (L) | -340 (LL) | -308 (LL) |
| 7 | -324 | -276 | -324 (L) | -276 (L) | -324 (L) | -276 (L) | -324 (LL) | -276 (LL) |
| 8 | -292 | -260 | -292 (L) | -260 (L) | -292 (L) | -260 (L) | -292 (LL) | -260 (LL) |
| 9 | -252 | -220 | -252 (L) | -220 (L) | -252 (L) | -220 (L) | -252 (LL) | -220 (LL) |
| 10 | -236 | -188 | -236 (L) | -188 (L) | -236 (L) | -188 (L) | -236 (LL) | -188 (LL) |
| 11 | -204 | -172 | -204 (L) | -172 (L) | -204 (L) | -172 (L) | -204 (LL) | -172 (LL) |
| 12 | -172 | -140 | -172 (L) | -140 (L) | -172 (L) | -140 (L) | -172 (LL) | -140 (LL) |
| 13 | -156 | -108 | -156 (L) | -108 (L) | -156 (L) | -108 (L) | -156 (LL) | -108 (LL) |
| 14 | -124 | -92 | -124 (L) | -92 (L) | -124 (L) | -92 (L) | -124 (LL) | -92 (LL) |
| 15 | -92 | -60 | -92 (L) | -60 (L) | -92 (L) | -60 (L) | -92 (LL) | -60 (LL) |
| 16 | -76 | -28 | -76 (L) | -28 (L) | -76 (L) | -28 (L) | -76 (LL) | -28 (LL) |
| 17 | -44 | -12 | -44 (L) | -12 (L) | -44 (L) | -12 (L) | -44 (LL) | -12 (LL) |
| 18 | 12 | 44 | 12 (L) | 44 (L) | 12 (L) | 44 (L) | 12 (LL) | 44 (LL) |
| 19 | 28 | 76 | 28 (L) | 76 (L) | 28 (L) | 76 (L) | 28 (LL) | 76 (LL) |
| 20 | 60 | 92 | 60 (L) | 92 (L) | 60 (L) | 92 (L) | 60 (LL) | 92 (LL) |
| 21 | 92 | 124 | 92 (L) | 124 (L) | 92 (L) | 124 (L) | 92 (LL) | 124 (LL) |
| 22 | 108 | 156 | 108 (L) | 156 (L) | 108 (L) | 156 (L) | 108 (LL) | 156 (LL) |
| 23 | 140 | 172 | 140 (L) | 172 (L) | 140 (L) | 172 (L) | 140 (LL) | 172 (LL) |

| | | | | | | | | |
|---|---|---|---|---|---|---|---|---|
| 24 | 172 | 204 | 172 (L) | 204 (L) | 172 (L) | 204 (L) | 172 (LL) | 204 (LL) |
| 25 | 188 | 236 | 188 (L) | 236 (L) | 188 (L) | 236 (L) | 188 (LL) | 236 (LL) |
| 26 | 220 | 252 | 220 (L) | 252 (L) | 220 (L) | 252 (L) | 220 (LL) | 252 (LL) |
| 27 | 260 | 292 | 260 (L) | 292 (L) | 260 (L) | 292 (L) | 260 (LL) | 292 (LL) |
| 28 | 276 | 324 | 276 (L) | 324 (L) | 276 (L) | 324 (L) | 276 (LL) | 324 (LL) |
| 29 | 308 | 340 | 308 (L) | 340 (L) | 308 (L) | 340 (L) | 308 (LL) | 340 (LL) |
| 30 | 340 | 372 | 340 (L) | 372 (L) | 340 (L) | 372 (L) | 340 (LL) | 372 (LL) |
| 31 | 356 | 404 | 356 (L) | 404 (L) | 356 (L) | 404 (L) | 356 (LL) | 404 (LL) |
| 32 | 388 | 420 | 388 (L) | 420 (L) | 388 (L) | 420 (L) | 388 (LL) | 420 (LL) |
| 33 | 420 | 452 | 420 (L) | 452 (L) | 420 (L) | 452 (L) | 420 (LL) | 452 (LL) |
| 34 | 436 | 484 | 436 (L) | 484 (L) | 436 (L) | 484 (L) | 436 (LL) | 484 (LL) |
| 35 | 468 | 500 | 468 (L) | 500 (L) | 468 (L) | 500 (L) | 468 (LL) | 500 (LL) |
| 36 | | | -500 (H) | -468 (H) | -500 (M) | -468 (M) | -500 (LH) | -468 (LH) |
| 37 | | | -484 (H) | -436 (H) | -484 (M) | -436 (M) | -484 (LH) | -436 (LH) |
| 38 | | | -452 (H) | -420 (H) | -452 (M) | -420 (M) | -452 (LH) | -420 (LH) |
| 39 | | | -420 (H) | -388 (H) | -420 (M) | -388 (M) | -420 (LH) | -388 (LH) |
| 40 | | | -404 (H) | -356 (H) | -404 (M) | -356 (M) | -404 (LH) | -356 (LH) |
| 41 | | | -372 (H) | -340 (H) | -372 (M) | -340 (M) | -372 (LH) | -340 (LH) |
| 42 | | | -340 (H) | -308 (H) | -340 (M) | -308 (M) | -340 (LH) | -308 (LH) |
| 43 | | | -324 (H) | -276 (H) | -324 (M) | -276 (M) | -324 (LH) | -276 (LH) |
| 44 | | | -292 (H) | -260 (H) | -292 (M) | -260 (M) | -292 (LH) | -260 (LH) |
| 45 | | | -252 (H) | -220 (H) | -252 (M) | -220 (M) | -252 (LH) | -220 (LH) |
| 46 | | | -236 (H) | -188 (H) | -236 (M) | -188 (M) | -236 (LH) | -188 (LH) |
| 47 | | | -204 (H) | -172 (H) | -204 (M) | -172 (M) | -204 (LH) | -172 (LH) |
| 48 | | | -172 (H) | -140 (H) | -172 (M) | -140 (M) | -172 (LH) | -140 (LH) |
| 49 | | | -156 (H) | -108 (H) | -156 (M) | -108 (M) | -156 (LH) | -108 (LH) |
| 50 | | | -124 (H) | -92 (H) | -124 (M) | -92 (M) | -124 (LH) | -92 (LH) |
| 51 | | | -92 (H) | -60 (H) | -92 (M) | -60 (M) | -92 (LH) | -60 (LH) |
| 52 | | | -76 (H) | -28 (H) | -76 (M) | -28 (M) | -76 (LH) | -28 (LH) |
| 53 | | | -44 (H) | -12 (H) | -44 (M) | -12 (M) | -44 (LH) | -12 (LH) |

| | | | | | | | | |
|---|---|---|---|---|---|---|---|---|
| 54 | | | 12 (H) | 44 (H) | 12 (M) | 44 (M) | 12 (LH) | 44 (LH) |
| 55 | | | 28 (H) | 76 (H) | 28 (M) | 76 (M) | 28 (LH) | 76 (LH) |
| 56 | | | 60 (H) | 92 (H) | 60 (M) | 92 (M) | 60 (LH) | 92 (LH) |
| 57 | | | 92 (H) | 124 (H) | 92 (M) | 124 (M) | 92 (LH) | 124 (LH) |
| 58 | | | 108 (H) | 156 (H) | 108 (M) | 156 (M) | 108 (LH) | 156 (LH) |
| 59 | | | 140 (H) | 172 (H) | 140 (M) | 172 (M) | 140 (LH) | 172 (LH) |
| 60 | | | 172 (H) | 204 (H) | 172 (M) | 204 (M) | 172 (LH) | 204 (LH) |
| 61 | | | 188 (H) | 236 (H) | 188 (M) | 236 (M) | 188 (LH) | 236 (LH) |
| 62 | | | 220 (H) | 252 (H) | 220 (M) | 252 (M) | 220 (LH) | 252 (LH) |
| 63 | | | 260 (H) | 292 (H) | 260 (M) | 292 (M) | 260 (LH) | 292 (LH) |
| 64 | | | 276 (H) | 324 (H) | 276 (M) | 324 (M) | 276 (LH) | 324 (LH) |
| 65 | | | 308 (H) | 340 (H) | 308 (M) | 340 (M) | 308 (LH) | 340 (LH) |
| 66 | | | 340 (H) | 372 (H) | 340 (M) | 372 (M) | 340 (LH) | 372 (LH) |
| 67 | | | 356 (H) | 404 (H) | 356 (M) | 404 (M) | 356 (LH) | 404 (LH) |
| 68 | | | 388 (H) | 420 (H) | 388 (M) | 420 (M) | 388 (LH) | 420 (LH) |
| 69 | | | 420 (H) | 452 (H) | 420 (M) | 452 (M) | 420 (LH) | 452 (LH) |
| 70 | | | 436 (H) | 484 (H) | 436 (M) | 484 (M) | 436 (LH) | 484 (LH) |
| 71 | | | 468 (H) | 500 (H) | 468 (M) | 500 (M) | 468 (LH) | 500 (LH) |
| 72 | | | | | -500 (H) | -468 (H) | -500 (HL) | -468 (HL) |
| 73 | | | | | -484 (H) | -436 (H) | -484 (HL) | -436 (HL) |
| 74 | | | | | -452 (H) | -420 (H) | -452 (HL) | -420 (HL) |
| 75 | | | | | -420 (H) | -388 (H) | -420 (HL) | -388 (HL) |
| 76 | | | | | -404 (H) | -356 (H) | -404 (HL) | -356 (HL) |
| 77 | | | | | -372 (H) | -340 (H) | -372 (HL) | -340 (HL) |
| 78 | | | | | -340 (H) | -308 (H) | -340 (HL) | -308 (HL) |
| 79 | | | | | -324 (H) | -276 (H) | -324 (HL) | -276 (HL) |
| 80 | | | | | -292 (H) | -260 (H) | -292 (HL) | -260 (HL) |
| 81 | | | | | -252 (H) | -220 (H) | -252 (HL) | -220 (HL) |
| 82 | | | | | -236 (H) | -188 (H) | -236 (HL) | -188 (HL) |
| 83 | | | | | -204 (H) | -172 (H) | -204 (HL) | -172 (HL) |

| | | | | | | | | |
|---|---|---|---|---|---|---|---|---|
| 84 | | | | | -172 (H) | -140 (H) | -172 (HL) | -140 (HL) |
| 85 | | | | | -156 (H) | -108 (H) | -156 (HL) | -108 (HL) |
| 86 | | | | | -124 (H) | -92 (H) | -124 (HL) | -92 (HL) |
| 87 | | | | | -92 (H) | -60 (H) | -92 (HL) | -60 (HL) |
| 88 | | | | | -76 (H) | -28 (H) | -76 (HL) | -28 (HL) |
| 89 | | | | | -44 (H) | -12 (H) | -44 (HL) | -12 (HL) |
| 90 | | | | | 12 (H) | 44 (H) | 12 (HL) | 44 (HL) |
| 91 | | | | | 28 (H) | 76 (H) | 28 (HL) | 76 (HL) |
| 92 | | | | | 60 (H) | 92 (H) | 60 (HL) | 92 (HL) |
| 93 | | | | | 92 (H) | 124 (H) | 92 (HL) | 124 (HL) |
| 94 | | | | | 108 (H) | 156 (H) | 108 (HL) | 156 (HL) |
| 95 | | | | | 140 (H) | 172 (H) | 140 (HL) | 172 (HL) |
| 96 | | | | | 172 (H) | 204 (H) | 172 (HL) | 204 (HL) |
| 97 | | | | | 188 (H) | 236 (H) | 188 (HL) | 236 (HL) |
| 98 | | | | | 220 (H) | 252 (H) | 220 (HL) | 252 (HL) |
| 99 | | | | | 260 (H) | 292 (H) | 260 (HL) | 292 (HL) |
| 100 | | | | | 276 (H) | 324 (H) | 276 (HL) | 324 (HL) |
| 101 | | | | | 308 (H) | 340 (H) | 308 (HL) | 340 (HL) |
| 102 | | | | | 340 (H) | 372 (H) | 340 (HL) | 372 (HL) |
| 103 | | | | | 356 (H) | 404 (H) | 356 (HL) | 404 (HL) |
| 104 | | | | | 388 (H) | 420 (H) | 388 (HL) | 420 (HL) |
| 105 | | | | | 420 (H) | 452 (H) | 420 (HL) | 452 (HL) |
| 106 | | | | | 436 (H) | 484 (H) | 436 (HL) | 484 (HL) |
| 107 | | | | | 468 (H) | 500 (H) | 468 (HL) | 500 (HL) |
| 108 | | | | | | | -500 (HH) | -468 (HH) |
| 109 | | | | | | | -484 (HH) | -436 (HH) |
| 110 | | | | | | | -452 (HH) | -420 (HH) |
| 111 | | | | | | | -420 (HH) | -388 (HH) |
| 112 | | | | | | | -404 (HH) | -356 (HH) |
| 113 | | | | | | | -372 (HH) | -340 (HH) |

| | | | | | | | | |
|---|---|---|---|---|---|---|---|---|
| 114 | | | | | | | -340 (HH) | -308 (HH) |
| 115 | | | | | | | -324 (HH) | -276 (HH) |
| 116 | | | | | | | -292 (HH) | -260 (HH) |
| 117 | | | | | | | -252 (HH) | -220 (HH) |
| 118 | | | | | | | -236 (HH) | -188 (HH) |
| 119 | | | | | | | -204 (HH) | -172 (HH) |
| 120 | | | | | | | -172 (HH) | -140 (HH) |
| 121 | | | | | | | -156 (HH) | -108 (HH) |
| 122 | | | | | | | -124 (HH) | -92 (HH) |
| 123 | | | | | | | -92 (HH) | -60 (HH) |
| 124 | | | | | | | -76 (HH) | -28 (HH) |
| 125 | | | | | | | -44 (HH) | -12 (HH) |
| 126 | | | | | | | 12 (HH) | 44 (HH) |
| 127 | | | | | | | 28 (HH) | 76 (HH) |
| 128 | | | | | | | 60 (HH) | 92 (HH) |
| 129 | | | | | | | 92 (HH) | 124 (HH) |
| 130 | | | | | | | 108 (HH) | 156 (HH) |
| 131 | | | | | | | 140 (HH) | 172 (HH) |
| 132 | | | | | | | 172 (HH) | 204 (HH) |
| 133 | | | | | | | 188 (HH) | 236 (HH) |
| 134 | | | | | | | 220 (HH) | 252 (HH) |
| 135 | | | | | | | 260 (HH) | 292 (HH) |
| 136 | | | | | | | 276 (HH) | 324 (HH) |
| 137 | | | | | | | 308 (HH) | 340 (HH) |
| 138 | | | | | | | 340 (HH) | 372 (HH) |
| 139 | | | | | | | 356 (HH) | 404 (HH) |
| 140 | | | | | | | 388 (HH) | 420 (HH) |
| 141 | | | | | | | 420 (HH) | 452 (HH) |
| 142 | | | | | | | 436 (HH) | 484 (HH) |
| 143 | | | | | | | 468 (HH) | 500 (HH) |

| AGGREGATED BANDWIDTH | RU INDICATION | | | | | | |
|---|---|---|---|---|---|---|---|
| | 160 MHz (E-S =7) | 140 MHz (E-S =6) | 120 MHz (E-S =5) | 100 MHz (E-S =4) | 80 MHz (E-S =3) | 60 MHz (E-S =2) | 40 MHz (E-S =1) |
| 160 MHz | 111111 | | | | | | |
| 140 MHz | 011111 (6) | 11111x (1) | | | | | |
| 120 MHz | 001111 (15) | 01111x (5) | 1111xx (1) | | | | |
| 100 MHz | 000111 (20) | 00111x (10) | 0111xx (4) | 111xxx (1) | | | |
| 80 MHz | 000011 (15) | 00011x (10) | 0011xx (6) | 011xxx (3) | 11xxxx (1) | | |
| 60 MHz | 000001 (6) | 00001x (5) | 0001xx (4) | 001xxx (3) | 01xxxx (2) | 1xxxxx (1) | |
| 40 MHz | 000000 (1) | 00000x (1) | 0000xx (1) | 000xxx (1) | 00xxxx (1) | 0xxxxx (1) | Xxxxxx (1) |

| AGGREGATED BANDWIDTH | RU INDICATION | | | |
|---|---|---|---|---|
| | 320 MHz (E-S =15) | 280 MHz (E-S =13) | 240 MHz (E-S =11) | 200 MHz (E-S =9) |
| 320 MHz | 111111 | | | |
| 280 MHz | 011111 (6) | 11111x (1) | | |
| 240 MHz | 001111 (15) | 01111x (5) | 1111xx (1) | |
| 200 MHz | 000111 (20) | 00111x (10) | 0111xx (4) | 111xxx (1) |
| 160 MHz | 000011 (15) | 00011x (10) | 0011xx (6) | 011xxx (3) |
| 120 MHz | 000001 (6) | 00001x (5) | 0001xx (4) | 001xxx (3) |
| 80 MHz | 000000 (1) | 00000x (1) | 0000xx (1) | 000xxx (1) |

FIG. 10A 1000-2

| AGGREGATED BANDWIDTH | RU INDICATION | | | |
|---|---|---|---|---|
| | 320 MHz (E-S =15) | 280 MHz (E-S =12) | 240 MHz (E-S =10) | 200 MHz (E-S =8) |
| 300 MHz | 111111 | | | |
| 260 MHz | 011111 (6) | 11111x (1) | | |
| 220 MHz | 001111 (15) | 01111x (5) | 1111xx (1) | |
| 180 MHz | 000111 (20) | 00111x (10) | 0111xx (4) | 111xxx (1) |
| 140 MHz | 000011 (15) | 00011x (10) | 0011xx (6) | 011xxx (3) |
| 100 MHz | 000001 (6) | 00001x (5) | 0001xx (4) | 001xxx (3) |
| 60 MHz | 000000 (1) | 00000x (1) | 0000xx (1) | 000xxx (1) |

FIG. 10B

| RU INDEX WITH RESOLUTION OF 242 | CQI ONLY FEEDBACK RU INDEX WITH RESOLUTION OF 26 SIZED RU |
|---|---|
| 0 | (0-8) |
| 1 | (9-17) |
| 2 | (18-26) |
| 3 | (27-35) |
| 4 | (36-44) |
| 5 | (45-53) |
| 6 | (54-62) |
| 7 | (63-71) |
| 8 | (72-80) |
| 9 | (81-89) |
| 10 | (90-98) |
| 11 | (99-107) |
| 12 | (108-116) |
| 13 | (117-125) |
| 14 | (126-134) |
| 15 | (135-143) |

| AGGREGATED BANDWIDTH | # OF CASES TO SIGNAL | AGGREGATED BANDWIDTH | # OF CASES TO SIGNAL |
|---|---|---|---|
| 20 MHz | 8 | 160 | 1 |
| 40 (DIS-CONTIGUOUS NOT ALLOWED AND PRIMARY OR SECONDARY 40 MHz OR SIMILAR PARTITION CASES ONLY IS ALLOWED) | 4 | 140 | 8 |
| 60 (AGGREGATED WITHIN 80 MHz PORTION IS ALLOWED) | 8 | 120 (AGGREGATION OF 40 MHz IS CONSIDERED) | 4 |
| 80 (AGGREGATION OF TWO 40 MHz IS CONSIDERED) | 4 | 100 | 24 |

FIG. 12

METHOD AND APPARATUS FOR WIRELESS COMMUNICATIONS

CROSS-REFERENCE TO RELATED APPLICATIONS

This application is entitled to the benefit of U.S. Provisional Patent Application Ser. No. 63/015,202, filed on Apr. 24, 2020, and India Provisional Patent Application Serial Number 202021029065, filed on Jul. 8, 2020, and India Provisional Patent Application Serial Number 202021031611, filed on Jul. 23, 2020, and India Provisional Patent Application Serial Number 202021031558, filed on Jul. 23, 2020, and India Provisional Patent Application Serial Number 202021032715, filed on Jul. 30, 2020, and India Provisional Patent Application Serial Number 202021041440, filed on Sep. 24, 2020, each of which is incorporated by reference herein.

BACKGROUND

In wireless communications, wireless devices, e.g., access points (APs) of an AP multi-link device (MLD), can transmit and/or solicit data to and from clients, e.g., stations (STAs) or STA MLDs, through one or more communication links. For example, certain APs may wirelessly transmit data to one or more wireless clients through one or more wireless communication links to solicit bandwidth information from the one or more clients. To facilitate the proper transmission of data between APs and corresponding clients, an indication is needed to identify which particular bandwidth information is solicited. However, typical wireless communications technology may not be able to efficiently identify solicited bandwidth information. Therefore, there is a need for wireless communications technology that can efficiently indicate solicited bandwidth information.

SUMMARY

Embodiments of a method and an apparatus for wireless communications are disclosed. In an embodiment, a method for wireless communications involves operating an Access Point (AP) using feedback subcarrier indices for a bandwidth of up to 320 MHz, signaling, by the AP, to a client, a subcarrier location set on which a feedback report is solicited, and the feedback type that the report will include, and indicating, by the client, feedback subcarrier indices for the subcarrier location set via the feedback report solicited by the AP.

In an embodiment, the AP has defined feedback subcarrier indices for a bandwidth that is at least one of 80 MHz, 160 MHz, and 80+80 MHz.

In an embodiment, x(L) represents a subcarrier index in an 80 MHz segment that has a lower frequency and x(H) represents the subcarrier index in an 80 MHz segment that has a higher frequency, and wherein x represents subcarrier indices for the bandwidth.

In an embodiment, the AP has defined feedback subcarrier indices for a bandwidth that is at least one of 240 MHz and 80+160 MHz.

In an embodiment, x(L) represents a subcarrier index in an 80 MHz segment that has the lowest frequency, x(M) represents the subcarrier index in an 80 MHz segment that is the center segment, and x(H) represents the subcarrier index in an 80 MHz segment that has the highest frequency, and wherein x represents subcarrier indices for the bandwidth.

In an embodiment, the AP has defined feedback subcarrier indices for a bandwidth that is at least 320 MHz.

In an embodiment, x(LL) represents a subcarrier index in an 80 MHz segment that has the lowest frequency, x(LH) represents the subcarrier index in an 80 MHz segment whose frequency is higher than the lowest frequency, x(HL) represents the subcarrier index in an 80 MHz segment whose frequency is lower than a highest frequency, and x(HH) represents the subcarrier index in an 80 MHz segment that has the highest frequency, and wherein x represents subcarrier indices for the bandwidth.

In an embodiment, feedback subcarrier indices used in the feedback report where the bandwidth is at least 80 MHz are a mirrored replication of feedback subcarrier indices used in a bandwidth of 40 MHz within each 80 MHz portion of the bandwidth that is at least 80 MHz.

In an embodiment, for a sounding bandwidth of at most 160 MHz, partial bandwidth information is defined via 9-bits indicating each of the possible combinations for an aggregation of 242-sized Resource Units (RUs), and wherein an aggregation of more than two RUs is considered.

In an embodiment, for a sounding bandwidth greater than 160 MHz, partial bandwidth information is defined via 9-bits indicating each of the possible combinations for an aggregation of 484-sized RUs, and wherein an aggregation of more than two RUs is considered.

In an embodiment, the 9-bit partial bandwidth information includes a resolution bit indicating the feedback resolution of 242-size RU or 484-size RU, and 8-bit bitmap indicating the request for each resolution RU size.

In an embodiment, partial bandwidth information is defined via 14-bits, wherein RU aggregation is included via the 14-bits used to define partial bandwidth information, and wherein RU indexing may be specified with respect to a 242-sized RU.

In an embodiment, partial bandwidth information defined via 14-bits includes a starting RU index that uses 4-bits, an ending RU index that uses 4-bits, and a specific RU indication that uses 6-bits.

In an embodiment, a small sized RU is indicated when the starting RU index and the ending RU index are the same.

In an embodiment, a large sized RU is indicated when the starting RU index and the ending RU index are different.

In an embodiment, the AP performs partial bandwidth signaling using 16-bits, such that 8-bits indicate an RU index of a starting subcarrier and the other 8-bits indicate the RU index of an ending subcarrier, wherein RU indexing is specified with respect to a 26-sized RU, and wherein channel puncturing information is signaled via a Disallowed Subchannel bitmap.

In an embodiment, a primary 160 MHz segment and a secondary 160 MHz segment are given Subchannel Selective Transmission (SST) operation with Orthogonal Frequency-Division Multiple Access (OFDMA) transmission, and wherein the primary 160 MHz segment and the secondary 160 MHz segment are signaled using 10-bits.

In an embodiment, a feedback report required from the primary 160 MHz segment is signaled via the last bit of the 10-bits being “0”, and wherein a feedback report required from the secondary 160 MHz segment is signaled via the last bit of the 10-bits being “1”.

In an embodiment, the AP transmits an Extremely High-Throughput (EHT) Null Data Packet Announcement (NDPA) frame that includes a Sounding Dialog Token field that is used to indicate that the transmitted EHT NDPA frame is an EHT NDPA frame type, and wherein indicating the EHT NDPA frame type involves setting bit zero (B0) and bit one (B1) of the Sounding Dialog Token field to (1 1).

In an embodiment, the AP indicates the feedback is either beamforming feedback on each subcarrier, or channel quality indication (CQI) on the subcarrier set.

In an embodiment, the CQI feedback is defined for each 242-tone RU, where the feedback report includes 9 CQI values for each 242-tone RU, where each value corresponds to each 26-tone RU within the 242-tone RU.

An embodiment of an AP is also disclosed. The AP includes a processor configured to operate using feedback subcarrier indices for a bandwidth of at least 80 MHz, signal, to a client, a subcarrier location set on which a feedback report is solicited, and receive, from the client, an indication of feedback subcarrier indices for the subcarrier location set via the feedback report solicited by the AP.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2 depicts a table that represents feedback subcarrier indices that correspond to different subcarrier spacings for different bandwidths in accordance with an embodiment of the invention.

FIG. 3 depicts another table that represents feedback subcarrier indices that correspond to different subcarrier spacings for different bandwidths in accordance with an embodiment of the invention.

FIG. 4 depicts another table that represents feedback subcarrier indices that correspond to different subcarrier spacings for different bandwidths in accordance with an embodiment of the invention.

FIGS. 5A-5E depict a table that represents feedback subcarrier indices that correspond to a subcarrier spacing of four (Ng=4) for different bandwidths in accordance with an embodiment of the invention.

FIGS. 6A-6E depict a table that represents feedback subcarrier indices that correspond to a subcarrier spacing of 16 (Ng=16) for different bandwidths in accordance with an embodiment of the invention.

FIG. 7 depicts another table that represents feedback subcarrier indices that correspond to a subcarrier spacing of 16 (Ng=16) for different bandwidths in accordance with an embodiment of the invention.

FIGS. 8A-8E depict another table that represents feedback subcarrier indices that correspond to a subcarrier spacing of 16 (Ng=16) for different bandwidths in accordance with an embodiment of the invention.

FIG. 9 depicts a table that represents specific Resource Unit (RU) indications using 6-bits for a bandwidth of at most 160 MHz in accordance with an embodiment of the invention.

FIG. 10A depicts a table that represents specific RU indications using 6-bits for a bandwidth greater than 160 MHz in accordance with an embodiment of the invention.

FIG. 10B depicts another table that represents specific RU indications using 6-bits for a bandwidth greater than 160 MHz in accordance with an embodiment of the invention.

FIG. 11 depicts a table that represents CQI feedback 26-tone RU indices within each 242-tone RU for up to 320 MHz bandwidth.

FIG. 12 depicts a table that represents signaling requirements for an aggregated bandwidth of no more than 160 MHz in accordance with an embodiment of the invention.

Throughout the description, similar reference numbers may be used to identify similar elements.

DETAILED DESCRIPTION

Figure 1:
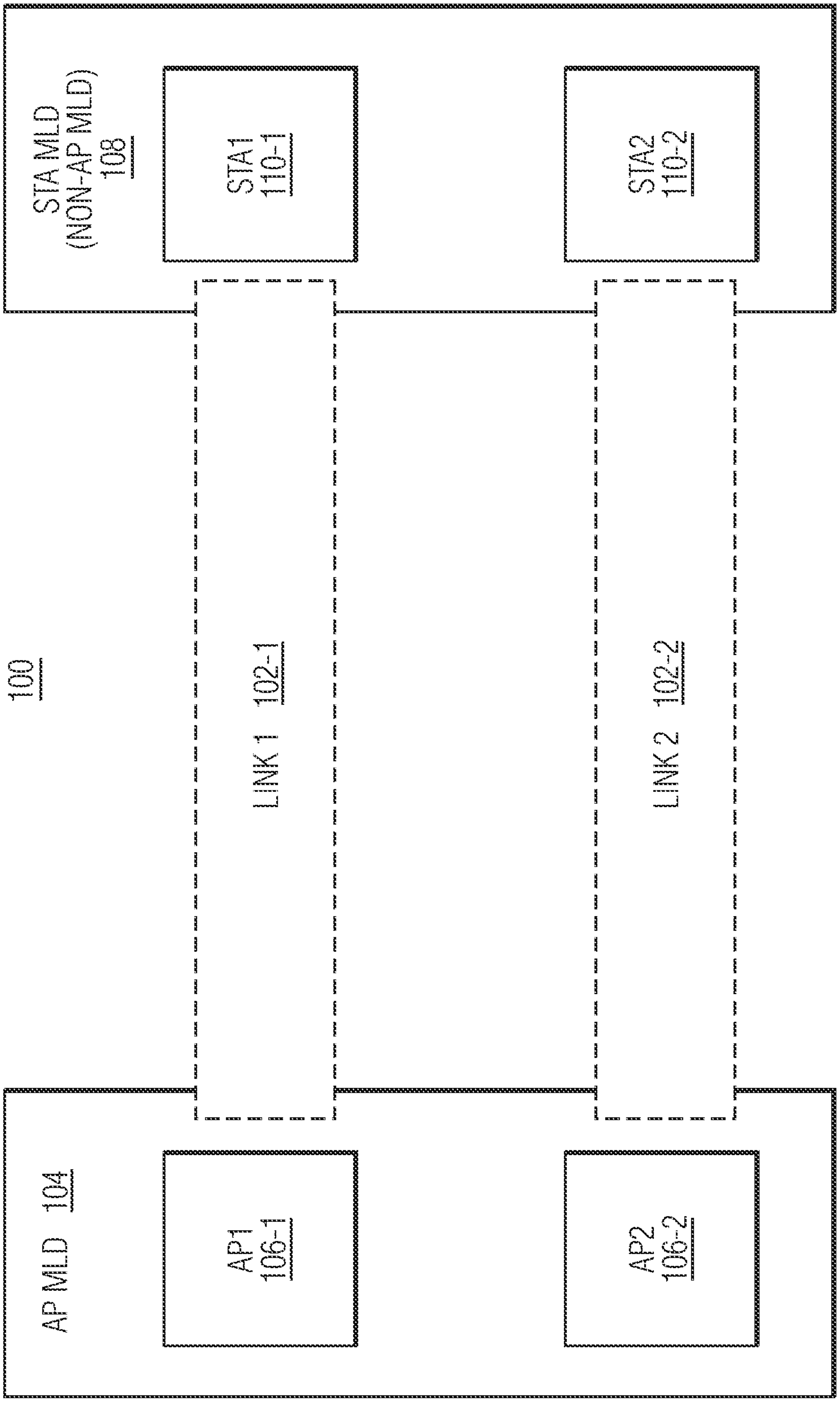
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, an access point (AP) that may be affiliated with an AP multi-link device (MLD) (e.g., wireless device) of a wireless local area network (WLAN) transmits data to at least one associated client, e.g., non-AP stations (STA) affiliated with a non-AP STA MLD (e.g., a STA MLD). The AP is configured to operate with associated clients according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated clients within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as APs 106-1 and 106-2. In such an embodiment, the APs may be AP1 106-1 and AP2 106-2. In some embodiments, the AP MLD 104 implements upper layer Media Access Control (MAC) functionalities (e.g., block acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless clients (e.g., STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size bandwidth. For example, AP1 106-1 may operate in a 320 MHz bandwidth and AP2 106-2 may operate in a 160 MHz bandwidth. Although the AP MLD 104 is shown in FIG. 1 as including two APs, other embodiments of the AP MLD 104 may include more than two APs or less than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), Beacons, management frames, etc.) between an AP and a client (e.g., a STA). In some embodiments, a 20 MHz channel may be a punctured 20 MHz channel or an unpunctured 20 MHz channel. In some embodiments, the 20 MHz channels may be aggregated to form a subchannel (e.g., an 80 MHz subchannel or a 160 MHz subchannel). Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

In wireless communications, Orthogonal Frequency-Division Multiple Access (OFDMA) allows multiple clients to transmit and/or receive data from an AP simultaneously by sharing available bandwidth. For example, OFDMA allows subcarriers in a bandwidth to be grouped into Resource Units (RUs), which may be assigned to different clients to enable communication with APs in uplink (UL) and downlink (DL) transmissions. In some embodiments, an RU may include a group of subcarrier indices (sometimes referred to herein as "tones" or "tone indices"), for example, a single RU may include a minimum of 26 tones and a maximum of 996 tones if a bandwidth is limited to 80 MHz, 2×996 tones if the bandwidth is limited to 160 MHz, and/or 4×996 tones if the bandwidth is limited to 320 MHz. As an example, there may be a maximum of 996 tones per each 80 MHz portion of a bandwidth. In some embodiments, subcarrier indices may be included in a feedback report to communicate bandwidth information between wireless devices. As an example, an AP that uses feedback subcarrier indices (that correspond to a bandwidth) may signal to a client (e.g., a STA), a subcarrier location set on which a feedback report is solicited. In such an example, the client responds to the AP by indicating feedback subcarrier indices for the subcarrier location set via the feedback report. Consequently, legacy communication protocols only define feedback subcarrier indices for wireless devices using bandwidths of up to a maximum of 160 MHz. According to the EHT communication protocol, wireless devices may operate using bandwidths greater than 160 MHz (e.g., 240 MHz, 160+80 MHz, 320 MHz, or 160+160 MHz), causing a deficiency in defined feedback subcarrier indices. Therefore, to support signaling of feedback subcarrier indices for wireless devices operating according to the EHT communication protocol, new feedback subcarrier indices are defined.

In accordance with an embodiment of the invention, a technique for wireless communications involves operating an AP using feedback subcarrier indices for a bandwidth of at least 80 MHz, signaling, by the AP, to a client, a subcarrier location set on which a feedback report is solicited, and indicating, by the client, feedback subcarrier indices for the subcarrier location set via the feedback report solicited by the AP. In some embodiments, the AP may have defined feedback subcarrier indices for a bandwidth of 80 MHz, 160 MHz, or 80+80 MHz. In some embodiments, the AP may have defined feedback subcarrier indices for a bandwidth of 240 MHz or 160+80 MHz. In some embodiments, the AP may have defined feedback subcarrier indices for a bandwidth of 320 MHz or 160+160 MHz. Thus, the techniques described herein enable the signaling of feedback subcarrier indices for wireless devices that operate using bandwidths of at least 80 MHz. By identifying feedback subcarrier indices for wireless devices using bandwidths larger than 160 MHz, wireless communications may be performed more efficiently.

In some embodiments, feedback subcarrier indices with respect to a new 80 MHz tone plan may be defined for different subcarrier spacings. In one embodiment, Ng=4, such that "Ng=4" represents subcarrier spacing where a client sends feedback for every 4 subcarrier indices included in an RU. In another embodiment, Ng=16, such that "Ng=16" represents subcarrier spacing where the client sends feedback for every 16 subcarrier indices included in the RU.

In some embodiments, for a 996 tone RU, a superset of feedback subcarrier indices may be used by an AP when soliciting a feedback report. In such an embodiment, feedback subcarrier indices used in a feedback report in which a bandwidth is at least 80 MHz may be a mirrored replication of feedback subcarrier indices used in a bandwidth of 40 MHz within each 80 MHz portion of the bandwidth. For example, if a bandwidth of 80 MHz is divided into two portions, e.g., a lower 40 MHz portion and an upper 40 MHz portion, then the feedback subcarrier indices used for the lower 40 MHz portion may be the same as in the bandwidth of 40 MHz. In such an example, the feedback subcarrier indices are shifted to the lower 40 MHz portion and the upper 40 MHz portion is a mirror replica of the lower 40 MHz portion.

Feedback subcarrier indices for a 996 tone RU that may be used by an AP operating with a bandwidth of at least 80 MHz are described in detail with reference to FIG. 2, FIG. 3, and FIG. 4.

FIG. 2 depicts a table, 200, that represents feedback subcarrier indices that correspond to different subcarrier spacings for different bandwidths in accordance with an embodiment of the invention. With reference to FIG. 2, the table may include a superset of feedback subcarrier indices that correspond to Ng=4 and Ng =16 for bandwidths of 80 MHz, 160 MHz, and 80+80 MHz, and that may be used by an AP to signal, to a client, a subcarrier location set on which a feedback report is solicited. In particular, FIG. 2 shows three columns, implemented as a first column that indicates bandwidth, a second column that indicates subcarrier spacing (shown in the table as "Ng"), and a third column that indicates a corresponding superset of subcarrier indices. In some embodiments, a 160 MHz bandwidth may represent two adjacent 80 MHz channels. In some embodiments, an 80+80 MHz bandwidth may represent two separate 80 MHz channels. In such an embodiment, x(L) represents a subcarrier index in an 80 MHz segment that has a lower frequency and x(H) represents the subcarrier index in an 80 MHz segment that has a higher frequency, such that x represents subcarrier indices for the corresponding bandwidth and subcarrier spacing. In some embodiments, a segment (sometimes referred to herein as a "band") may include several channels that make up a portion of an entire bandwidth, e.g., two 80 MHz segments may be included in a bandwidth of 160 MHz. In some embodiments, the lower frequency may be a set of tones present in an 80 MHz segment that corresponds to the lower 80 MHz segment of a 160 MHz bandwidth and the higher frequency may be another set of tones present in an 80 MHz segment that corresponds to the upper 80 MHz segment of the 160 MHz bandwidth, where the 160 MHz bandwidth=[Lower 80 MHz segment and Upper 80 MHz segment].

FIG. 3 depicts another table, 300, that represents feedback subcarrier indices that correspond to different subcarrier spacings for different bandwidths in accordance with an embodiment of the invention. With reference to FIG. 3, the table may include a superset of feedback subcarrier indices that correspond to Ng=4 and Ng =16 for bandwidths of 240 MHz or 80+160 MHz, and that may be used by an AP to signal, to a client, a subcarrier location set on which a feedback report is solicited. In particular, FIG. 3 shows three columns, implemented as a first column that indicates bandwidth, a second column that indicates subcarrier spacing (shown in the table as "Ng"), and a third column that indicates a corresponding superset of subcarrier indices. In some embodiments, the 240 MHz bandwidth may be contiguous, such that the 240 MHz bandwidth may include three adjacent 80 MHz channels, a 160 MHz channel with an adjacent left or right 80 MHz channel, or a 320 MHz channel with a punctured corner 80 MHz channel.

With reference to FIG. 3, x(L) represents a subcarrier index in an 80 MHz segment that has the lowest frequency, x(M) represents the subcarrier index in an 80 MHz segment that is the center segment, and x(H) represents the subcarrier index in an 80 MHz segment that has the highest frequency, such that x represents subcarrier indices for the corresponding bandwidth and subcarrier spacing. In one embodiment, when x(L) represents the subcarrier index in the 80 MHz segment that has the lowest frequency, the lowest frequency 80 MHz segment may be the left 80 MHz segment or the lower 80 MHz segment if the bandwidth is 80+160 MHz or 160+80 MHz, respectively. In another embodiment, when x(L) represents the subcarrier index in the 80 MHz segment that has the lowest frequency, the lowest frequency 80 MHz segment may be the lower 80 MHz segment of an upper 160 MHz band or the upper 80 MHz segment of a lower 160 MHz band if the right most 80 MHz segment is punctured or if the left most 80 MHz segment is punctured, respectively. In one embodiment, when x(M) represents the subcarrier index in the 80 MHz segment that is the center segment, the center 80 MHz segment may be the lower 80 MHz segment or the upper 80 MHz segment of the 160 MHz band if the bandwidth is 80+160 MHz or 160+80 MHz, respectively. In another embodiment, when x(M) represents the subcarrier index in the 80 MHz segment that is the center segment, the center 80 MHz segment may be the upper 80 MHz segment of the lower 160 MHz band or the lower 80 MHz segment of the upper 160 MHz band if the right most 80 MHz segment is punctured or if the left most 80 MHz segment is punctured, respectively. In one embodiment, when x(H) represents the subcarrier index in the 80 MHz segment that has the highest frequency, the highest frequency 80 MHz segment may be the upper 80 MHz segment if the bandwidth is 80+160 MHz or 160+80 MHz. In another embodiment, when x(H) represents the subcarrier index in the 80 MHz segment that has the highest frequency, the highest frequency 80 MHz segment may be the lower 80 MHz segment or the upper 80 MHz segment of the upper 160 MHz band if the right most 80 MHz segment is punctured or if the left most 80 MHz segment is punctured, respectively.

FIG. 4 depicts another table, 400, that represents feedback subcarrier indices that correspond to different subcarrier spacings for different bandwidths in accordance with an embodiment of the invention. With reference to FIG. 4, the table may include a superset of feedback subcarrier indices that correspond to Ng=4 and Ng =16 for bandwidths of 320 MHz or 160+160 MHz, and that may be used by an AP to signal, to a client, a subcarrier location set on which a feedback report is solicited. In particular, FIG. 4 shows three columns, implemented as a first column that indicates bandwidth, a second column that indicates subcarrier spacing (shown in the table as "Ng"), and a third column that indicates a corresponding superset of subcarrier indices. In some embodiments, the 320 MHz bandwidth may be contiguous, such that the 320 MHz bandwidth may include four adjacent 80 MHz channels or two adjacent 160+160 MHz channels.

With reference to FIG. 4, x(LL) represents a subcarrier index in an 80 MHz segment that has the lowest frequency, x(LH) represents the subcarrier index in an 80 MHz segment whose frequency is higher than the lowest frequency, x(HL) represents the subcarrier index in an 80 MHz segment whose frequency is lower than the highest frequency, and x(HH) represents the subcarrier index in an 80 MHz segment that has the highest frequency, such that x represents subcarrier indices for the bandwidth. In some embodiments, when x(LL) represents the subcarrier index in the 80 MHz segment that has the lowest frequency (e.g., a first 80 MHz segment), the 80 MHz segment may be the lower 80 MHz segment of the lower 160 MHz band. In some embodiments, when x(LH) represents the subcarrier index in the 80 MHz segment whose frequency is higher than the lowest frequency (e.g., a second 80 MHz segment), the 80 MHz segment may be the upper 80 MHz segment of the lower 160 MHz band. In some embodiments, when x(HL) represents the subcarrier index in the 80 MHz segment whose frequency is lower than the highest frequency (e.g., a third 80 MHz segment), the 80 MHz segment may be the lower 80 MHz segment of an upper 160 MHz band. In some embodiments, when x(HH) represents the subcarrier index in the 80 MHz segment that has the highest frequency (e.g., a fourth 80 MHz segment), the 80 MHz segment may be the upper 80 MHz segment of the upper 160 MHz band.

With further reference to FIG. 4, x(LL), x(LH), x(HL), and x(HH) may also be implemented in a bandwidth greater than 320 MHz (or 160+160 MHz), such that when the bandwidth increases in order of 80 MHz (either through a separate bandwidth or through puncturing) the same set of subcarrier indices included by x(LL), x(LH), x(HL), and x(HH) as shown in FIG. 4 may be followed for each 80 MHz segment. As an example, if the bandwidth is 640 MHz, then it may include eight 80 MHz segments, in which x(i) (i=0, 1, . . . 7) may cover each 80 MHz segment. As another example, if the bandwidth is 400 MHz, then it may include five 80 MHz segments, in which x(i) (i=0, 1, . . . 4) may cover each 80 MHz segment. In such an example, the bandwidth of 400 MHz may be obtained from 320+80 MHz, 640-240 MHz (puncturing), or 480-80 MHz (puncturing), etc.

In some embodiments, for an OFDMA mode of transmission, feedback from multiple clients (e.g., STAs) may be limited to a subset of RUs, e.g., feedback may be sent from a subset of subcarriers as a form of "partial feedback". In such an embodiment, a Null Data Packet Announcement (NDPA) transmitted by an AP to client(s) (e.g., STA or STAs) may include partial bandwidth information that indicates a starting RU index (start_RU_index) and an ending RU index (end_RU_index) on which a feedback report is solicited. In an embodiment, "S" may represent a starting feedback subcarrier index that needs feedback for a corresponding RU index and "E" may represent an ending feedback subcarrier index that needs feedback for another corresponding RU index, such that the corresponding RU indices are each 26 tone RUs. In such an example, each of the feedback subcarrier indices between "S(start_RU_index)" and "E(end_RU_index)" from the superset subcarrier index for the corresponding Ng value as depicted in FIG. 2, FIG. 3, and FIG. 4 may be included in the feedback report of a feedback report frame. In some embodiments, the feedback report frame is transmitted by the client to the AP in response to a solicited feedback report and indicates the feedback subcarrier indices between S and E as signaled by the AP. As an example, if an AP signals S=0 and E=1 in a bandwidth of 80 MHz for Ng=4, then "5(0)=−500", "E(1)=−448", and the feedback subcarrier indices are {−500, −496, 31 492, . . . , −456, −452, −448}.

In some embodiments, partial feedback may involve the starting feedback subcarrier index and the ending feedback subcarrier index each being a 26-sized RU for Ng=4 or Ng=16 with a bandwidth of 80 MHz, 160 MHz, 240 MHz, or 320 MHz. In such an embodiment, each of the feedback subcarrier indices from the superset of subcarrier indices between the starting feedback subcarrier index and the ending feedback subcarrier index may be sent as feedback in a compressed feedback mode. Furthermore, in such an embodiment, x(L), x(M), x(H), x(LL), x(LH), x(HL), and x(HH) may be applied to such feedback subcarrier indices.

Feedback subcarrier indices for a 26-sized RU that may be used by an AP operating with a bandwidth of 80 MHz, 160 MHz, 240 MHz, or 320 MHz are described in detail with reference to FIGS. 5A-5E and FIG. 6A-6E.

FIGS. 5A-5E depict a table, 500, that represents feedback subcarrier indices that correspond to a subcarrier spacing of four (Ng=4) for different bandwidths in accordance with an embodiment of the invention. With reference to FIGS. 5A-5E, the table may include starting feedback subcarrier indices (shown in the table 500 by "S") and ending feedback subcarrier indices (shown in the table 500 by "E") for RU indices that correspond to Ng=4 for bandwidths of 80 MHz, 160 MHz or 80+80 MHz, 240 MHz or 80+160 MHz, and 320 MHz or 160+160 MHz. In some embodiments, the RU indices may be used by an AP to signal, via an NDPA transmitted to client(s) (e.g., STA(s)), a subcarrier location set on which a feedback report is solicited. In some embodiments, the starting feedback subcarrier indices and the ending feedback subcarrier indices may be used by the client (e.g., STA) to indicate, via a feedback report transmitted to an AP, the subcarrier location set on which the feedback report is solicited. In particular, FIGS. 5A-5E show nine columns, implemented as a first column that indicates an RU index, a second column that indicates S for an 80 MHz bandwidth, a third column that indicates E for the 80 MHz bandwidth, a fourth column that indicates S for a 160 MHz or 80+80 MHz bandwidth, a fifth column that indicates E for the 160 MHz or 80+80 MHz bandwidth, a sixth column that indicates S for a 240 MHz or 80+160 MHz bandwidth, a seventh column that indicates E for the 240 MHz or 80+160 MHz bandwidth, an eighth column that indicates S for a 320 MHz or 160+160 MHz bandwidth, and a ninth column that indicates E for the 320 MHz or 160+160 MHz bandwidth. In such an embodiment, x(L), x(M), x(H), x(LL), x(LH), x(HL), and x(HH) as defined by FIG. 2, FIG. 3, and FIG. 4, may also be applied to the feedback subcarrier indices indicated in table 500 and may be extendable in order of 80 MHz (e.g., additional 80 MHz segments) for bandwidths greater than 320 MHz.

FIGS. 6A-6E depict a table, 600, that represents feedback subcarrier indices that correspond to a subcarrier spacing of 16 (Ng=16) for different bandwidths in accordance with an embodiment of the invention. With reference to FIGS. 6A-6E, the table may include starting feedback subcarrier indices (shown in the table 600 by "S") and ending feedback subcarrier indices (shown in the table 600 by "E") for RU indices that correspond to Ng=16 for bandwidths of 80 MHz, 160 MHz or 80+80 MHz, 240 MHz or 80+160 MHz, and 320 MHz or 160+160 MHz. In some embodiments, the RU indices may be used by an AP to signal, via an NDPA transmitted to client(s), a subcarrier location set on which a feedback report is solicited. In some embodiments, the starting feedback subcarrier indices and the ending feedback subcarrier indices may be used by the client (e.g., the STA) to indicate, via a feedback report transmitted to an AP, the subcarrier location set on which the feedback report is solicited. In particular, FIGS. 6A-6E show nine columns, implemented as a first column that indicates an RU index, a second column that indicates S for an 80 MHz bandwidth, a third column that indicates E for the 80 MHz bandwidth, a fourth column that indicates S for a 160 MHz or 80+80 MHz bandwidth, a fifth column that indicates E for the 160 MHz or 80+80 MHz bandwidth, a sixth column that indicates S for a 240 MHz or 80+160 MHz bandwidth, a seventh column that indicates E for the 240 MHz or 80+160 MHz bandwidth, an eighth column that indicates S for a 320 MHz or 160+160 MHz bandwidth, and a ninth column that indicates E for the 320 MHz or 160+160 MHz bandwidth. In such an embodiment, x(L), x(M), x(H), x(LL), x(LH), x(HL), and x(HH) as defined by FIG. 2, FIG. 3, and FIG. 4, may also be applied to the feedback subcarrier indices indicated in table 600 and may be extendable in order of 80 MHz (e.g., additional 80 MHz segments) for bandwidths greater than 320 MHz.

In another embodiment, the superset of subcarrier indices for Ng=16 may be defined differently from the superset of subcarrier indices for Ng=16 as described in FIG. 2, FIG. 3, and FIG. 4. In such an embodiment, the superset of subcarrier indices for Ng=4 may be the same as described in FIG. 2, FIG. 3, and FIG. 4, but to be consistent with Ng=16 of a 40 MHz tone plan, the superset of subcarrier indices for Ng=16 may be redefined.

Feedback subcarrier indices for Ng=16 and 996 tone RU that may be used by an AP operating with a bandwidth of at least 80 MHz are described in detail with reference to FIG. 7.

FIG. 7 depicts another table, 700, that represents feedback subcarrier indices that correspond to a subcarrier spacing of 16 (Ng=16) for different bandwidths in accordance with an embodiment of the invention. With reference to FIG. 7, the table may include a superset of feedback subcarrier indices that correspond to Ng =16 for bandwidths of 80 MHz, 160 MHz, 80+80 MHz, 240 MHz or 80+160 MHz, and 320 MHz or 160+160 MHz. In some embodiments, the superset of subcarrier indices may be used by an AP to signal, to a client, a subcarrier location set on which a feedback report is solicited. In particular, FIG. 7 shows three columns, implemented as a first column that indicates bandwidth, a second column that indicates subcarrier spacing (shown in the table as "Ng"), and a third column that indicates a corresponding superset of subcarrier indices. In such an embodiment, x(L), x(M), x(H), x(LL), x(LH), x(HL), and x(HH) as defined by FIG. 2, FIG. 3, and FIG. 4, may also be applied to the superset of feedback subcarrier indices indicated in table 700.

In some embodiments, the starting feedback subcarrier index and the ending feedback subcarrier index for each 26-sized RU for Ng=16 with a bandwidth of 80 MHz, 160 MHz, 240 MHz, or 320 MHz may also be redefined to align with the superset of subcarrier indices as described in FIG. 7. In such an embodiment, each of the feedback subcarrier indices from the superset of subcarrier indices between the starting feedback subcarrier index and the ending feedback subcarrier index may be sent as feedback in a compressed feedback mode. Furthermore, in such an embodiment, x(L), x(M), x(H), x(LL), x(LH), x(HL), and x(HH) may be applied to such feedback subcarrier indices.

Feedback subcarrier indices for Ng=16 and a 26-sized RU that may be used by an AP operating with a bandwidth of 80 MHz, 160 MHz, 240 MHz, or 320 MHz are described in detail with reference to FIGS. 8A-8E.

FIGS. 8A-8E depict another table, 800, that represents feedback subcarrier indices that correspond to a subcarrier spacing of 16 (Ng=16) for different bandwidths in accordance with an embodiment of the invention. With reference to FIGS. 8A-8E, the table may include starting feedback subcarrier indices (shown in the table 800 by “S”) and ending feedback subcarrier indices (shown in the table 800 by “E”) for RU indices that correspond to Ng=16 for bandwidths of 80 MHz, 160 MHz or 80+80 MHz, 240 MHz or 80+160 MHz, and 320 MHz or 160+160 MHz. In some embodiments, the RU indices may be used by an AP to signal, via an NDPA transmitted to client(s), a subcarrier location set on which a feedback report is solicited. In some embodiments, the starting feedback subcarrier indices and the ending feedback subcarrier indices may be used by the client (e.g., the STA) to indicate, via a feedback report transmitted to an AP, the subcarrier location set on which the feedback report is solicited. In particular, FIGS. 8A-8E show nine columns, implemented as a first column that indicates an RU index, a second column that indicates S for an 80 MHz bandwidth, a third column that indicates E for the 80 MHz bandwidth, a fourth column that indicates S for a 160 MHz or 80+80 MHz bandwidth, a fifth column that indicates E for the 160 MHz or 80+80 MHz bandwidth, a sixth column that indicates S for a 240 MHz or 80+160 MHz bandwidth, a seventh column that indicates E for the 240 MHz or 80+160 MHz bandwidth, an eighth column that indicates S for a 320 MHz or 160+160 MHz bandwidth, and a ninth column that indicates E for the 320 MHz or 160+160 MHz bandwidth. In such an embodiment, x(L), x(M), x(H), x(LL), x(LH), x(HL), and x(HH) as defined by FIG. 2, FIG. 3, and FIG. 4, may also be applied to the feedback subcarrier indices indicated in table 800 and may be extendable in order of 80 MHz (e.g., additional 80 MHz segments) for bandwidths greater than 320 MHz.

In some embodiments, feedback from client(s) (e.g., STA(s)) may not be limited to a subset of RUs, e.g., feedback may be sent from subcarriers as a form of “full feedback”. In one embodiment, full feedback may be part of a non-Trigger-based (non-TB) Null Data Packet (NDP) sequence. In another embodiment, full feedback may be included in a Trigger-based (TB) NDP sequence where a starting RU index may be the first RU index (e.g., $0^{th}$ index) of a corresponding bandwidth mentioned in an NDPA frame and an ending RU index may be the last RU index (e.g., $143^{rd}$ index) of the corresponding bandwidth mentioned in the NDPA frame. For example, when an AP transmits an NDPA frame with a corresponding bandwidth of 320 MHz, then full feedback from a client will include each of the feedback subcarrier indices from the starting RU index (e.g., $0^{th}$ index) to the ending RU index (e.g., $143^{rd}$ index) for the corresponding bandwidth of 320 MHz. In some embodiments, full feedback may involve using the superset of feedback subcarrier indices as described in FIG. 2, FIG. 3, FIG. 4, and/or FIG. 7. In such an embodiment, a compressed feedback angle may be computed for a set of feedback subcarrier indices and feedback from client (e.g., STA) to AP. In some embodiments, channel puncturing may be present within a corresponding bandwidth. In some embodiments, when channel puncturing is present within the corresponding bandwidth, then a “Disallowed Subchannel bitmap” may be used to indicate a punctured channel within the corresponding bandwidth (e.g., channel puncturing information). As an example, the Disallowed Subchannel bitmap may be extended from 160 MHz (8-bits) to 320 MHz (16-bits) in the EHT communication protocol.

As specified in the IEEE 802.11ax communication protocol, partial bandwidth may be signaled using 14-bits, such that 7-bits indicate the RU index of the starting subcarrier and the other 7-bits indicate the RU index of the ending subcarrier. According to the IEEE 802.11ax communication protocol, RU indexing may be specified with respect to a 26-sized RU. In addition, the total number of 26-sized RUs in a 160 MHz bandwidth may be 2*37, which requires 7-bits for signaling. However, the IEEE 802.11ax communication protocol does not account for RU aggregation as specified by the IEEE 802.11be communication protocol. Therefore, more bits may be needed to indicate an aggregated RU as specified by the IEEE 802.11be communication protocol. As an example, an extension of the IEEE 802.11be communication protocol may be to implement partial bandwidth signaling using 16-bits, such that 8-bits indicate the RU index of the starting subcarrier and the other 8-bits indicate the RU index of the ending subcarrier. In such an example, RU indexing may be specified with respect to a 26-sized RU. As a result, the total number of 26-sized RUs in a 320 MHz bandwidth may be 4*36, which requires 8-bits for signaling. Such an example enables efficient RU index signaling to indicate the RUs on which feedback may be requested.

In addition, according to the IEEE 802.11be communication protocol, RU aggregation may involve defining small sized RUs and large sized RUs. In some embodiments, small sized RUs may be RUs with a size of less than 242. In such an embodiment, RU aggregation may be within two contiguous RUs. In some embodiments, large sized RUs may be RUs with a size of at least 242. In some embodiments, small sized RUs may not be aggregated within large sized RUs.

In some embodiments, partial bandwidth information may be defined by using 14-bits. As an example, the 14-bits may include a starting RU index that may use 4-bits, an ending RU index that may use 4-bits, and a specific RU indication that may use 6-bits. In such an embodiment, RU aggregation may be included via the 14-bits used to define partial bandwidth information. In such an embodiment, RU indexing may be specified with respect to a 242-sized RU, such that the total number of 242-sized RUs in a bandwidth of 320 MHz will be 16. In some embodiments, if the starting RU index and the ending RU index are the same, then the indices may be indicating a small sized RU (e.g., an RU with a size of less than 242). In such an embodiment, the small sized RU may include a 242-sized RU in addition to the small sized RU. In some embodiments, if the starting RU index and the ending RU index are different, then the indices may be indicating a large sized RU (e.g., an RU with a size of at least 242). In some embodiments, the ending RU index may be greater than the starting RU index.

With reference to the specific RU indication that may use 6-bits, the specific RU indication may be defined for small sized RUs (e.g., including a 242-sized RU) and large sized RUs (e.g., excluding the 242-sized RU). In one embodiment, for small sized RUs, RU aggregation may be defined with respect to each contiguous RU, such that the RU size may be considered for each of the aggregated RUs that are contiguous. In such an embodiment, there may be an RU index for each RU size, such that there may be nine 26-sized RUs. In such an embodiment, the starting RU index may be zero to eight with respect to a 26-sized RU and the ending RU index may be zero to eight with respect to the 26-sized RU as long as the ending RU index is greater than or equal to the starting RU index. In such an embodiment, 45 RU combinations may be considered, e.g., "9 independent 26-sized RU"+"9C2", such that "9C2" represents 2 RUs in which a lower RU may be the starting RU index and an upper RU may be the ending RU index. Therefore, to represent each of the 45 RU combinations, the 6-bits used by the specific RU indication may be required.

In some embodiments, the 6-bits used by the specific RU indication may involve specific RU indexing value mapping where:

$$i = 9 * S_{26} - \frac{S_{26}(S_{26}+1)}{2} + E_{26} \quad (1)$$

According to (1), i may represent the index being mapped, $S_{26}$ may represent a starting RU index with respect to a 26-sized RU, and $E_{26}$ may represent an ending RU index with respect to a 26-sized RU. In addition, $S_{26}$ and $E_{26}$ may be within an indicated 242-sized RU, such that $S_{26}=\{0, \ldots, 8\}$ and $E_{26}=\{0, \ldots, 8\}$. Thus, an actual RU index with respect to an entire bandwidth may be determined such that S=Starting RU index*9+$S_{26}$ and E=Starting RU index*9 $E_{26}$.

In some embodiments, for large sized RU combinations, RU aggregation may be defined within a bandwidth of 160 MHz, such that feedback for multi RU aggregation may also be defined for the bandwidth of 160 MHz. However, unlike DL/UL OFDMA where specific RU aggregation is defined, each of the possible RU aggregations within the bandwidth of 160 MHz may be signaled. In some embodiments, a large sized RU may be indicated when a starting RU index and an ending RU index are different, such that RU indexing may be with respect to a 242-sized RU. For example, indication of a 320 MHz RU may involve the starting RU index being zero and the ending RU index being 15. As another example, indication of a 240 MHz RU may also involve the starting RU index being zero and the ending RU index being 15, but either a Disallowed Subchannel bitmap may be used to indicate an unused 80 MHz band or the specific RU indication (6-bits) may be used to indicate the unused 80 MHz band. Thus, indicating the unused 80 MHz band in the 240 MHz RU indication may involve the starting RU index being zero and the ending RU index being 11 or the starting RU index being four and the ending RU index being 15.

In some embodiments, for large sized RU combinations, the specific RU indication may use 6-bits to indicate each aggregated bandwidth within an RU indication for a bandwidth of at most 160 MHz. In such an embodiment, E (e.g., an ending subcarrier index) and S (e.g., a starting subcarrier index) values may indicate partial bandwidth information within the RU indication. In some embodiments, for large sized RU combinations, the specific RU indication may use 6-bits to indicate bands for which feedback is requested for a bandwidth greater than 160 MHz. In such an embodiment, whether a band is present or absent may be indicated via a 484-sized RU.

Specific RU indications using 6-bits for large sized RU combinations are described in detail with reference to FIG. 9 and FIGS. 10A-10B.

FIG. 9 depicts a table, 900, that represents specific Resource Unit (RU) indications using 6-bits for a bandwidth of at most 160 MHz in accordance with an embodiment of the invention. With reference to FIG. 9, the table may include large sized RU combinations in which specific RU indications use 6-bits to indicate aggregated bandwidth within an RU indication. For example, aggregated bandwidth in the RU indication may be indicated by "E–S", such that E represents an ending subcarrier index and S represents a starting subcarrier index. In some embodiments, the RU indication may be used by an AP to signal, via an NDPA transmitted to client(s) (e.g., STA(s)), a subcarrier location set on which a feedback report is solicited. In particular, FIG. 9 shows eight columns, implemented as a first column that indicates an aggregated bandwidth, a second column that represents how 6-bits may be encoded for a 160 MHz RU indication (shown as "160 MHz (E–S=7)"), a third column that represents how 6-bits may be encoded for a 140 MHz RU indication (shown as "140 MHz (E–S=6)"), a fourth column that represents how 6-bits may be encoded for a 120 MHz RU indication (shown as "120 MHz (E–S=5)"), a fifth column that represents how 6-bits may be encoded for a 100 MHz RU indication (shown as "100 MHz (E–S=4)"), a sixth column that represents how 6-bits may be encoded for an 80 MHz RU indication (shown as "80 MHz (E–S=3)"), a seventh column that represents how 6-bits may be encoded for a 60 MHz RU indication (shown as "60 MHz (E–S=2)"), and an eighth column that represents how 6-bits may be encoded for a 40 MHz RU indication (shown as "40 MHz (E–S=1)").

With reference to FIG. 9, each of the 6-bits in the specific RU indication may be represented by "0", "1", or "x", such that "0" represents a punctured 20 MHz band, "1" represents an unpunctured 20 MHz band, and "x" represents a reserved bit. In addition, in such an embodiment, the numbers in parentheses below each set of bits in the table 900 may represent the number of different possible combinations of specified bit values (not considering "x"). For example, when 6-bits are encoded for a 160 MHz RU indication with an aggregated bandwidth of 140 MHz, the 6-bits may be "011111", such that the first 20 MHz band after the starting RU index may be punctured. As another example, when 6-bits are encoded for the 160 MHz RU indication with the aggregated bandwidth of 140 MHz, the 6-bits may be "101111", such that the second 20 MHz band after the starting RU index may be punctured. Additional examples may include other bits within the set of 6-bits being zero or one.

FIG. 10A depicts a table, 1000-1, that represents specific RU indications using 6-bits for a bandwidth greater than 160 MHz in accordance with an embodiment of the invention. With reference to FIG. 10A, the table may include large sized RU combinations in which specific RU indications use 6-bits to indicate aggregated bandwidth within an RU indication. For example, aggregated bandwidth in the RU indication may be indicated by "E–S", such that E represents an ending subcarrier index and S represents a starting subcarrier index. In some embodiments, the RU indication may be used by an AP to signal, via an NDPA transmitted to client(s) (e.g., STA(s)), a subcarrier location set on which a feedback report is solicited. In particular, FIG. 10A shows five columns, implemented as a first column that indicates an aggregated bandwidth, a second column that represents how 6-bits may be encoded for a 320 MHz RU indication (shown as "320 MHz (E−S=15)"), a third column that represents how 6-bits may be encoded for a 280 MHz RU indication (shown as "280 MHz (E−S=13)"), a fourth column that represents how 6-bits may be encoded for a 240 MHz RU indication (shown as "240 MHz (E−S=11)"), and a fifth column that represents how 6-bits may be encoded for a 200 MHz RU indication (shown as "200 MHz (E−S=9)").

With reference to FIG. 10A, in some embodiments, when "E−S" is less than or equal to seven, then the 6-bit RU indication may be the same as the 6-bit RU indication specified in table 900, such that each bit represents whether a 20 MHz band is punctured or unpunctured. However, in some embodiments, when "E−S" is greater than seven, then the 6-bit RU indication may represent whether a 40 MHz band between the starting RU index and the ending RU index is punctured or unpunctured. In some embodiments, when "E−S" is 9, 11, 13, or 15, then the 6-bit RU indication may be the same as the 6-bit RU indication specified in table 900, except that each bit represents a 40 MHz band. For example, the starting RU index may indicate whether the first two adjacent 20 MHz bands (first 40 MHz band) are punctured or unpunctured. As another example, the ending RU index may indicate whether the last two adjacent 20 MHz bands (last 40 MHz band) are punctured or unpunctured. In addition, in such an embodiment, the numbers in parentheses below each set of bits in the table 1000-1 may represent the number of different possible combinations of specified bit values (not considering "x").

FIG. 10B depicts another table, 1000-2, that represents specific RU indications using 6-bits for a bandwidth greater than 160 MHz in accordance with an embodiment of the invention. With reference to FIG. 10B, the table may include large sized RU combinations in which specific RU indications use 6-bits to indicate aggregated bandwidth within an RU indication. For example, aggregated bandwidth in the RU indication may be indicated by "E−S", such that E represents an ending subcarrier index and S represents a starting subcarrier index. In some embodiments, the RU indication may be used by an AP to signal, via an NDPA transmitted to client(s) (e.g., STA(s)), a subcarrier location set on which a feedback report is solicited. In particular, FIG. 10B shows five columns, implemented as a first column that indicates an aggregated bandwidth, a second column that represents how 6-bits may be encoded for a 300 MHz RU indication (shown as "300 MHz (E−S=14)"), a third column that represents how 6-bits may be encoded for a 280 MHz RU indication (shown as "280 MHz (E−S=12)"), a fourth column that represents how 6-bits may be encoded for a 240 MHz RU indication (shown as "240 MHz (E−S=10)"), and a fifth column that represents how 6-bits may be encoded for a 200 MHz RU indication (shown as "200 MHz (E−S=8)").

With reference to FIG. 10B, in some embodiments, when "E−S" is 14, then each bit within the 6-bit RU indication represents whether a 40 MHz band is punctured or unpunctured. For example, the starting RU index may indicate whether the first two adjacent 20 MHz bands, e.g., first 40 MHz band (not included in the RU indication), are punctured or unpunctured and the ending RU index may indicate whether the last 20 MHz band (not included in the RU indication) is punctured or unpunctured. As another example, the starting RU index may represent a 20 MHz band and the ending RU index may represent a 40 MHz band. In some embodiments, when "E−S" is 12, 10, or 8, then the 6-bit RU indication may be the same as the 6-bit RU indication used when "E−S" is 14, such that alternatives may be indicated when using the last reserved bit (e.g., "x") of the 6-bits. In some embodiments, a 40 MHz band in the RU indication starts after the starting RU index ends. In addition, in such an embodiment, the numbers in parentheses below each set of bits in the table 1000-2 may represent the number of different possible combinations of specified bit values (not considering "x").

In some embodiments, once a specific RU or aggregated RUs are found using the partial bandwidth information, then a corresponding "S" and "E" as specified by FIGS. 5A-5E, FIGS. 6A-6E, or FIGS. 8A-8E may be used to obtain a set of subcarriers to be used for feedback. In some embodiments, the set of subcarriers to be used for feedback may be indicated by a client (e.g., a STA) via feedback subcarrier indices in a feedback report transmitted to an AP. In some embodiments, for larger RU aggregation, there may be multiple "S" and "E" values with respect to a 26-sized RU in table 500, table 600, or table 800 that may be derived. Two examples of larger RU aggregation where multiple "S" and "E" values may be derived are described herein.

In a first example, an 80 MHz bandwidth may include a distribution of [242L, 242R, 484], such that 242L and 242R may each be 242-sized RUs and 484 may be a 484-sized RU, and such that 242L and 484 may be aggregated. In such an example, partial bandwidth information may involve [0, 3, 6-bits to indicate the 242 and 484 aggregation] being equal to [0, 3 in decimal, (01xxxx) in bits]. Because the number of RUs aggregated is two (e.g., 242L and 484), there may be two sets, {S1, E1} and {S2, E2}, where S1=0, E1=9-1, S2=9*2, and E2=9*4−1. In a second example, a 160 MHz bandwidth may include a distribution of [242L1, 242L2, 242L3, 242L4, 242R1, 242R2, 242R3, 242R4], such that each RU is a 242-sized RU. In such an example, if 242L1, 242L3, and 242R4 are aggregated, then the partial bandwidth information may involve [1, 7 in decimal, (010000) in bits], such that there are three aggregated RUs, so S1=0, E1=9, S2=18, E2=27-1, S3=9*7, and E3=9*8−1. In such an example, if 242L2, 242L3, 242R1, and 242R3 are aggregated, then the partial bandwidth information may involve [1, 6 in decimal, (1010xx) in bits], such that there are three aggregated RUs (484+242R1, 242R3), so S1=9, E1=9*3−1, S2=9*4, E2=9*4−1, S3=9*6, and E3=9*7−1. In some embodiments, for each superset of subcarriers that fall between {Si} (starting RU index) and corresponding {Ei} (ending RU index), there should be feedback. In some embodiments, if there is a 996 RU in a particular 80 MHz segment, then each of the superset of subcarriers in that segment may be implemented as feedback.

In some embodiments, for compressed Channel Quality Indicator (CQI) feedback, for each 26-sized RU that is included between {Si} and corresponding {Ei}, a compressed CQI may be computed for feedback. In some embodiments, for a large sized RU indication, a mode may be added to support feedback per-242-sized RU (instead of every 26-sized RU). In some embodiments, a CQI mode may involve a CQI report per-RU, such that the CQI report per-RU may be the addition of Signal-to-Noise Ratio (SNR) in decibels over a 242-sized RU for which feedback is requested. Thus, the CQI report per-RU may be used for scheduling with less overhead and may allow usage of a 242-sized RU.

An example of CQI feedback based on 242-RU is described with reference to FIG. 11. FIG. 11 is a table that lists the 26-tone RU indices within each 242-tone RU that the CQI report can be requested. For up to 320 MHz bandwidth, there are up to 16 242-tone RU indices. In an embodiment, the AP can request a CQI report on each 242-tone RU from the client. The request is indicated in the partial bandwidth info field for the NDPA frame. Each 242-tone RU includes 9 CQI values, with each value computed over one 26-tone RU within the 242-tone RU. The CQI computation method for 26-tone RU is the same as in 802.11ax.

In some embodiments, for aggregated bandwidth less than or equal to 160 MHz, an 8-bit bitmap may be sufficient to indicate each of the possible combinations for the aggregation of 242-sized RUs, such that more than two RU aggregation may also be considered. In some embodiments, for aggregated bandwidth greater than 160 MHz, a 16-bit bitmap may be sufficient to indicate each of the possible combinations for the aggregation of 242-sized RUs. In some embodiments, for aggregated bandwidth greater than 160 MHz, an 8-bit bitmap may be sufficient to indicate each of the possible combinations for the aggregation of 484-sized RUs, such that more than two RU aggregation may also be considered. In such embodiments, an additional 1-bit may be used to indicate whether the RU may be a 242-sized RU or a 484-sized RU. Thus, 9-bits or 8-bits may be used to indicate each of the RU combinations with an RU size of 242 or 484. However, such embodiments may not indicate a specific RU of a 26-sized RU even for small RU cases. For small RU cases an AP may need to obtain feedback for an entire 242-sized RU containing the required 26-sized RUs and discard non-required values.

Cases of two RU aggregation for an aggregated bandwidth no greater than 160 MHz are described in detail with reference to FIG. 12.

FIG. 12 depicts a table, 1100, that represents signaling requirements for an aggregated bandwidth of no more than 160 MHz in accordance with an embodiment of the invention. With reference to FIG. 12, the table may include the aggregated bandwidth and a corresponding number of ways in which the aggregated bandwidth may be signaled with a minimum of 242-sized RUs. In particular, FIG. 12 shows four columns, implemented as a first column that indicates an aggregated bandwidth, a second column that represents a corresponding number of ways in which the aggregated bandwidth of the first column may be signaled (shown as "# of cases to signal"), a third column that indicates an aggregated bandwidth, and a fourth column that represents a corresponding number of ways in which the aggregated bandwidth of the third column may be signaled (shown as "# of cases to signal").

With reference to FIG. 12, a total of 63 cases may be required for signaling the aggregated bandwidth of no more than 160 MHz with a minimum of 242-sized RUs. In such an embodiment, 6-bits may be sufficient for such signaling. In some embodiments, for an aggregated bandwidth of 320 MHz, 6-bits may be sufficient if a similar aggregation format is used, such that a 242-sized RU (or 20 MHz) may be replaced by a 484-sized RU (or 40 MHz) and a 424-sized RU (or 40 MHz) may be replaced by a 996-sized RU (or 80 MHz). In some embodiments, 7-bits may be sufficient, such that an extra bit may be used to indicate an aggregation level (e.g., minimum RU size of 242 or 484).

In some embodiments, both a primary 160 MHz segment and a secondary 160 MHz segment may need to be equally given Subchannel Selective Transmission (SST) operation considering OFDMA transmission. In such an embodiment, partial bandwidth feedback request signaling of the primary 160 MHz segment and the secondary 160 MHz segment may be performed using 10-bits. As an example, the first 1-bit may be a resolution bit indicating the feedback request resolution of 242-tone RU or 484-tone RU, the second 8-bits may be a bitmap indicating each of the possible RU combinations, and the third 1-bit may be a primary/secondary bit indicating whether feedback is required from the primary 160 MHz segment or the secondary 160 MHz segment. In such an example, a primary/secondary bit of "0" may signal that a feedback report may be required from the primary 160 MHz segment, and a primary/secondary bit of "1" may signal that the feedback report may be required from the secondary 160 MHz segment. For example, when a resolution bit is set to 484, then the segment bit indication becomes irrelevant. In such an example, a resolution bit value of one and a segment bit value of zero can represent a 484-sized resolution, while a resolution bit value of one and a segment bit value of one can be reserved. In some embodiments, ordering of the 10-bits can be changed, for example, bit one may be a puncturing resolution, bit two may be a 160 MHz segment index, and bits three through ten may be an 8-bit puncturing pattern. In some embodiments, for an aggregated bandwidth greater than 160 MHz, 8-bits and a resolution bit may be used to indicate each of the possible combinations for an aggregation of 484-sized RUs, and such that an aggregation of more than two RUs may be considered. In some embodiments, a partial bandwidth feedback request may use 9-bits with a feedback resolution bit and an 8-bit bitmap, without the primary/secondary bit. When a resolution bit is set to 0, indicating resolution of 242-tone RU, the request can only be applied to up to 160 MHz bandwidth sounding. If the resolution bit is set to 1, indicating resolution of 484-tone RU, the request can be used for 320 MHz bandwidth sounding.

In some embodiments, NDP packets used for signaling may support more than one hole transmission (similar to OFDMA transmissions) for punctured information signaling. In some embodiments, punctured information signaling may be performed according to one of three techniques. According to a first technique, a Universal-Signal field (U-SIG) and/or an EHT-Signal field (EHT-SIG) in an NDP packet may be similar to that of an OFDMA mode. In some embodiments, the first technique may involve a puncturing subfield in an NDP using the same format as an uncompressed OFDMA mode. In some embodiments, the first technique may involve omitting an RU Allocation field in EHT-SIG as a receiver (e.g., client or STA) will know how to combine content channels based on puncturing information in U-SIG. In some embodiments, the first technique may involve the NDP transmission being indicated in U-SIG via (1) an unused entry for PPDU+EHT-SIG compression/format, or (2) EHT-Modulation and Coding Scheme (EHT-MCS) 0 and number of EHT-SIG symbol=1. According to a second technique, channel puncturing indication may be done in an NDPA using a special Association Identifier (AID). In some embodiments, the second technique may be similar to a High-Efficiency (HE) NDPA, except that the number of puncturing bits (e.g., "disallowed subchannel bitmap") may be extended from 8-bits to 16-bits. According to a third technique, the first technique and the second technique may be combined such that channel puncturing information may be signaled via both an NDPA and an NDP packet.

In addition, according to the IEEE 802.11be communication protocol, sounding procedures for channel status information identification via a beamformer (e.g., an AP) may be supported. In some embodiments, an HE NDPA frame format may reuse a type/subtype of a Very-High Throughput (VHT) NDPA for HE NDPAs aimed at more than one client (e.g., multiple STAs).

An HE NDPA frame format that reuses the type/subtype of a VHT NDPA is described in detail with reference to FIG. 13.

Figure 13:
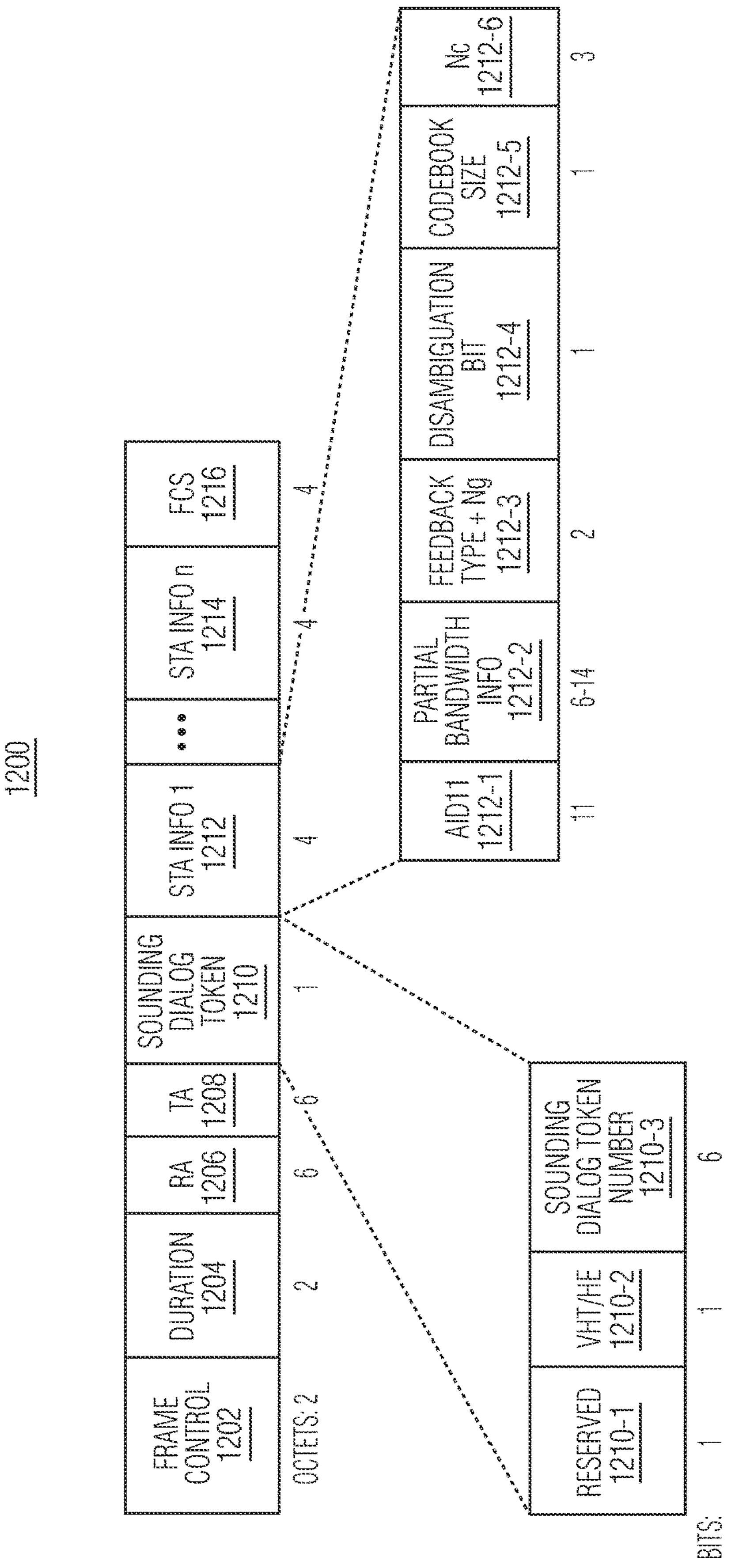
FIG. 13 depicts an example of a High-Efficiency (HE) Null Data Packet Announcement (NDPA) frame format.

FIG. 13 depicts an example of an HE NDPA frame format. In particular, FIG. 13 depicts fields of the HE NDPA that may be used by a beamformer (e.g., an AP) for sounding procedures for channel status information identification when the HE NDPA is aimed at more than one client (e.g., multiple STAs). With reference to FIG. 13, an HE NDPA 1200 includes a Frame Control field 1202 (2 octets), a Duration field 1204 (2 octets), a Receiving Address (RA) field 1206 (6 octets), a Transmission Address (TA) field 1208 (6 octets), a Sounding Dialog Token field 1210 (1 octet), a first per-STA Info field (shown as "STA Info 1") 1212 (4 octets), a subsequent per-STA Info field (shown as "STA Info n") 1214 (4 octets), and a Frame Check Sequence (FCS) field 1216 (4 octets). In such an embodiment, the Sounding Dialog Token field 1210 may include three subfields, implemented as Reserved 1210-1 (1-bit), VHT/HE 1210-2 (1-bit), and Sounding Dialog Token Number 1210-3 (6-bits). Additionally, in such an embodiment, the first per-STA Info field (shown as "STA Info 1") 1212 may include six subfields, implemented as AID11 1212-1 (11-bits), Partial Bandwidth Info 1212-2 (9-bits), Feedback type+Ng 1212-3 (2-bits), Disambiguation bit 1212-4 (1-bit), Codebook size 1212-5 (1-bit), and Number of columns (Nc) 1212-6 (3-bits).

With reference to FIG. 13, per-STA Info fields (e.g., the first per-STA Info field 1214 and the subsequent per-STA Info field 1216) may be 4 octets (4 bytes) to include more information. In some embodiments, AID11 1212-1 may be an 11 Least Significant Bit (LSB) of the AID of an HE STA when the HE NDPA 1200 is transmitted by an AP, otherwise AID11 1212-1 may be zero. In some embodiments, Partial BW Info 1212-2 may signal a start index and an end index for 26 tone RUs requested for feedback via the Start RU 1212-2*a* and the End RU 1212-2*b*, respectively. In some embodiments, 7-bits may be needed for a maximum of 74 RUs for start/end RUs. In some embodiments, Disambiguation bit 1212-4 (Bit 27) may be set to one to prevent a VHT STA from parsing bits 16 to 27 as the VHT STA's AID.

In some embodiments, an EHT NDPA frame may be indicated via an NDPA frame identification technique. According to the NDPA frame identification technique, the EHT NDPA frame may be defined as another variant of an NDPA frame. In some embodiments, the NDPA frame may include three variants such as, for example, a VHT NDPA frame, an HE NDPA frame, and the EHT NDPA frame. In such an embodiment, each variant may be distinguished by a setting of bit zero (B0) and bit one (B1) in a Sounding Dialog Token field (e.g., Sounding Dialog Token field 1210), such that B0 may be referred to as a "Ranging subfield" and B1 may be referred to as an "HE subfield". In one embodiment, if the Ranging subfield is set to zero and the HE subfield is set to zero (e.g., (B0 B1)=(0 0)), then the Sounding Dialog Token field may identify a frame as a VHT NDPA frame. In one embodiment, if the Ranging subfield is set to zero and the HE subfield is set to one (e.g., (B0 B1)=(0 1)), then the Sounding Dialog Token field may identify a frame as an HE NDPA frame. In one embodiment, if the Ranging subfield is set to one and the HE subfield is set to one (e.g., (B0 B1)=(1 1)), then the Sounding Dialog Token field may identify a frame as an EHT NDPA frame.

In some embodiments, when an NDPA frame is carried in a non-High Throughput (non-HT) duplicate PPDU format, the bandwidth of the PPDU carrying the NDPA frame may be indicated via several bandwidth indication techniques described herein.

According to a first bandwidth indication technique, one reserved bit (B0) (e.g., Reserved 1210-1) and an HE subfield of Sounding Dialog Token field (e.g., Sounding Dialog Token field 1210) may be jointly encoded with a VHT/HE/EHT indication and a bandwidth indication. In some embodiments, the first bandwidth indication technique involves (B0 B1)=(0 0) indicating a VHT NDPA frame with a bandwidth of 20 MHz, 40 MHz, 80 MHz, 160 MHz, or 80+80MHz, (B0 B1)=(0 1) indicating an HE/EHT NDPA frame with a bandwidth of 20 MHz, 40 MHz, 80 MHz, 160 MHz, or 80+80 MHz, (B0 B1)=(1 1) indicating an EHT NDPA frame with a bandwidth of 320 MHz or 160+160 MHz, and (B0 B1)=(1 0) being reserved.

According to a second bandwidth indication technique, an EHT NDPA frame may be defined as another variant of an NDPA frame, such that the EHT NDPA frame includes a subfield indicating the bandwidth of the EHT NDPA frame. In some embodiments, the second bandwidth indication technique involves one reserved bit (B0) in a Sounding Dialog Token field being used (together with an HE subfield) to indicate NDPA frame types. In some embodiments, the second bandwidth indication technique involves (B0 B1)=(0 0) indicating a VHT NDPA frame, (B0 B1)=(0 1) indicating an HE NDPA frame, (B0 B1)=(1 1) indicating an EHT NDPA frame, and/or (B0 B1)=(1 0) being reserved. In some embodiments, (B0 B1) of the Sounding Dialog Toke field may be used to indicate that the NDPA frame may be an EHT NDPA frame (e.g., an EHT NDPA frame type), such that indicating the EHT NDPA frame type involves setting bit zero (B0) and bit one (B1) of the Sounding Dialog Token field to (1 1). In addition, in some embodiments, another subfield (e.g., a Service field for a non-HT or non-HT duplicate PPDU format and/or a Bandwidth subfield in a U-SIG field for an EHT PPDU format) may be used to indicate a bandwidth of the EHT NDPA frame.

According to a third bandwidth indication technique, 7-bits of a scrambling sequence may be used to indicate the bandwidth of a PPDU carrying an NDPA frame. In some embodiments, the third bandwidth indication technique involves 3-bits being used to indicate bandwidth within the 7-bits of the scrambling sequence. In such an embodiment, 3-bits may be used for a pseudorandom non-zero integer for randomization, 1-bit may be used for a dynamic bandwidth indication, and 3-bits may be used for a bandwidth indication.

Figure 14:
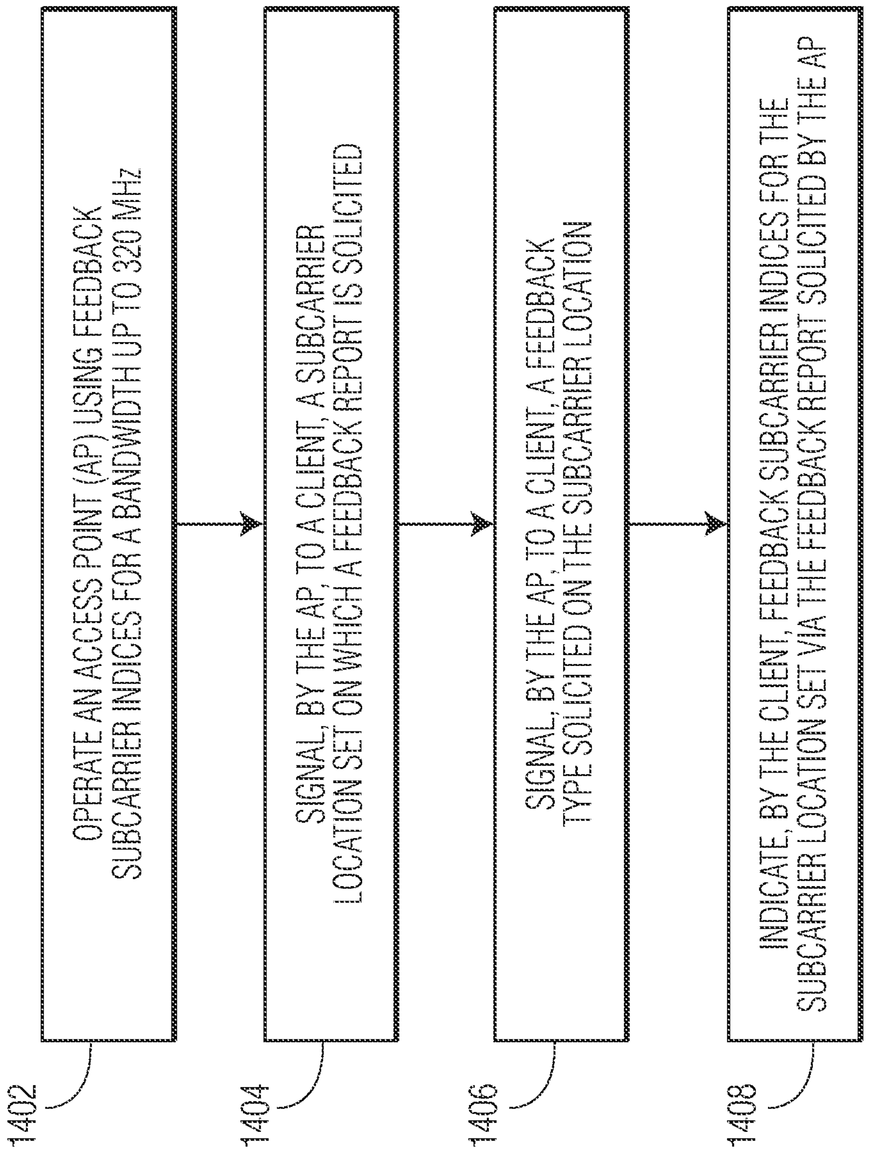
FIG. 14 illustrates a flow diagram of a technique for wireless communications in accordance with an embodiment of the invention.

FIG. 14 illustrates a flow diagram of a technique for wireless communications in accordance with an embodiment of the invention. At block 1402, an AP operates using feedback subcarrier indices for a bandwidth up to 320 MHz. At block 1404, the AP signals to a client, a subcarrier location set on which a feedback report is solicited. At block 1406, the AP signals, to a client, a feedback type solicited on the subcarrier location. At block 1408, the client indicates feedback subcarrier indices for the subcarrier location set via the feedback report solicited by the AP.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:

operating an Access Point (AP) to receive a sounding feedback report from a client for a sounding bandwidth up to 320 MHz;

signaling, by the AP, to flail the client, in a Null Data Packet Announcement (NDPA) frame a feedback subcarrier location set on which flail the feedback report is solicited;

and indicating, by the client, feedback subcarrier indices for the subcarrier location set via the feedback report solicited by the AP;

wherein for the sounding bandwidth of at most 160 MHz, the feedback subcarrier location set is indicated by 9-bits which indicate each of the possible combinations for an aggregation of 242-sized Resource Units (RUs) for the sounding bandwidth, wherein for the sounding bandwidth greater than 160 MHz, the feedback subcarrier location set is indicated by 9-bits which indicate each of the possible combinations for an aggregation of 484-sized RUs for the sounding bandwidth, and wherein an aggregation of more than two RUs is considered.

2. The method of claim 1, wherein the AP has defined feedback subcarrier indices for a bandwidth that is at least one of 80 MHz, 160 MHz, and 80+80 MHz.

3. The method of claim 2, wherein x(L) represents a subcarrier index in an 80 MHz segment that has a lower frequency and x(H) represents the subcarrier index in an 80 MHz segment that has a higher frequency, and wherein x represents subcarrier indices for the bandwidth.

4. The method of claim 1, wherein the AP has defined feedback subcarrier indices for a bandwidth that is at least one of 240 MHz and 80+160 MHz.

5. The method of claim 4, wherein x(L) represents a subcarrier index in an 80 MHz segment that has the lowest frequency, x(M) represents the subcarrier index in an 80 MHz segment that is the center segment, and x(H) represents the subcarrier index in an 80 MHz segment that has the highest frequency, and wherein x represents subcarrier indices for the bandwidth.

6. The method of claim 1, wherein the AP has defined feedback subcarrier indices for a bandwidth that is at least 320 MHz.

7. The method of claim 6, wherein x(LL) represents a subcarrier index in an 80 MHz segment that has the lowest frequency, x(LH) represents the subcarrier index in an 80 MHz segment whose frequency is higher than the lowest frequency, x(HL) represents the subcarrier index in an 80 MHz segment whose frequency is lower than a highest frequency, and x(HH) represents the subcarrier index in an 80 MHz segment that has the highest frequency, and wherein x represents subcarrier indices for the bandwidth.

8. The method of claim 1, wherein feedback subcarrier indices used in the feedback report where the bandwidth is at least 80 MHz are a mirrored replication of feedback subcarrier indices used in a bandwidth of 40 MHz within each 80 MHz portion of the bandwidth that is at least 80 MHz.

9. A method for wireless communications, the method comprising:

operating an Access Point (AP) using feedback subcarrier indices for a bandwidth up to 320 MHz:

signaling, by the AP, to a client, a subcarrier location set on which a feedback report is solicited;

signaling, by the AP, to a client, a feedback type solicited on the subcarrier location; and indicating, by the client, feedback subcarrier indices for the subcarrier location set via the feedback report solicited by the AP wherein a partial bandwidth feedback information is defined using 9 bits for a sounding bandwidth up to 320 MHz;

wherein 1 bit is a resolution bit used to indicate the feedback resolution of either 242-tone RU or 484-tone RU, and an 8-bit bitmap indicates each of the possible combinations for an aggregation of feedback resolution RU size.

10. A method for wireless communications, the method comprising:

operating an Access Point (AP) using feedback subcarrier indices for a bandwidth up to 320 MHz:

signaling, by the AP, to a client, a subcarrier location set on which a feedback report is solicited;

signaling, by the AP, to a client, a feedback type solicited on the subcarrier location; and indicating, by the client, feedback subcarrier indices for the subcarrier location set via the feedback report solicited by the AP, wherein a partial bandwidth feedback information is defined via 14-bits;

wherein RU aggregation is included via the 14-bits used to define the partial bandwidth feedback information;

and wherein RU indexing may be specified with respect to a 242-sized RU.

11. The method of claim 10, wherein partial bandwidth information defined via 14-bits includes a starting RU index that uses 4-bits, an ending RU index that uses 4-bits, and a specific RU indication that uses 6-bits.

12. The method of claim 11, wherein a small sized RU is indicated when the starting RU index and the ending RU index are the same.

13. The method of claim 11, wherein a large sized RU is indicated when the starting RU index and the ending RU index are different.

14. The method of claim 1, wherein the AP performs partial bandwidth signaling using 16-bits, such that 8-bits indicate an RU index of a starting subcarrier and the other 8-bits indicate the RU index of an ending subcarrier;

wherein RU indexing is specified with respect to a 26-sized RU; and wherein channel puncturing information is signaled via a Disallowed Subchannel bitmap.

15. The method of claim 1, wherein a primary 160 MHz segment and a secondary 160 MHz segment are given Subchannel Selective Transmission (SST) operation with Orthogonal Frequency-Division Multiple Access (OFDMA) transmission; and wherein the primary 160 MHz segment and the secondary 160 MHz segment are signaled using 10-bits.

16. The method of claim 15, wherein a feedback report required from the primary 160 MHz segment is signaled via the last bit of the 10-bits being "0"; and wherein a feedback report required from the secondary 160 MHz segment is signaled via the last bit of the 10-bits being "1".

17. A method for wireless communications, the method comprising:

operating an Access Point (AP) using feedback subcarrier indices for a sounding bandwidth up to 320 MHz;

signaling, by the AP, to a client, a subcarrier location set on which a feedback report is solicited;

signaling, by the AP, to a client, a feedback type solicited on the subcarrier location; and indicating, by the client, feedback subcarrier indices for the subcarrier location set via the feedback report solicited by the AP, wherein the AP solicits channel quality indication (CQI) feedback from the client;

wherein the feedback RU location is indicated with partial BW feedback information with resolution of 242-tone RU or 484-tone RU.

18. The method of claim 17, wherein the CQI is computed on each 26-tone RU;

wherein CQI report includes 9 CQI values for a 242-tone RU and 18 CQI values for a 484-tone RU.

19. The method of claim 1, wherein the AP transmits an Extremely High-Throughput (EHT) Null Data Packet Announcement (NDPA) frame that includes a Sounding Dialog Token field that is used to indicate that the transmitted EHT NDPA frame is an EHT NDPA frame type; and wherein indicating the EHT NDPA frame type involves setting bit zero (B0) and bit one (B1) of the Sounding Dialog Token field to (1 1).

20. An access point (AP) comprising:

a processor configured to:

operate an Access Point (AP) to receive a sounding feedback report from a client for a sounding bandwidth up to 320 MHz;

signal, by the AP, to flail the client, in a Null Data Packet Announcement (NDPA) frame a feedback subcarrier location set on which flail the feedback report is solicited;

and indicate, by the client, feedback subcarrier indices for the subcarrier location set via the feedback report solicited by the AP;

wherein for the sounding bandwidth of at most 160 MHz, the feedback subcarrier location set is indicated by 9-bits which indicate each of the possible combinations for an aggregation of 242-sized Resource Units (RUs) for the sounding bandwidth, wherein for the sounding bandwidth greater than 160 MHz, the feedback subcarrier location set is indicated by 9-bits which indicate each of the possible combinations for an aggregation of 484-sized RUs for the sounding bandwidth, and wherein an aggregation of more than two RUs is considered.

21. The method of claim 1, wherein the AP is a beamformer.

22. The AP of claim 20, wherein the AP is a beamformer.

23. The method of claim 17, wherein for the sounding bandwidth of at most 160 MHz, 9-bits are used to indicate each of the possible combinations for an aggregation of 242-sized Resource Units (RUs), wherein for the sounding bandwidth greater than 160 MHz, 9-bits are used to indicate each of the possible combinations for an aggregation of 484-sized RUs, and wherein an aggregation of more than two RUs is considered.

* * * * *